(12) United States Patent
Nakama et al.

(10) Patent No.: US 10,768,380 B2
(45) Date of Patent: Sep. 8, 2020

(54) FERRULE, FERRULE WITH OPTICAL FIBER, AND METHOD OF MANUFACTURING FERRULE WITH OPTICAL FIBER

(71) Applicant: FUJIKURA LTD., Tokyo (JP)

(72) Inventors: Akihiro Nakama, Chiba (JP); Shigeo Takahashi, Chiba (JP); Hirotaka Asada, Chiba (JP); Kazuaki Toba, Tokyo (JP); Masanari Yamamoto, Tokyo (JP); Ryohei Takahashi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/471,007

(22) PCT Filed: Dec. 7, 2017

(86) PCT No.: PCT/JP2017/044071
§ 371 (c)(1),
(2) Date: Jun. 19, 2019

(87) PCT Pub. No.: WO2018/116855
PCT Pub. Date: Jun. 28, 2018

(65) Prior Publication Data
US 2020/0088954 A1    Mar. 19, 2020

(30) Foreign Application Priority Data

Dec. 19, 2016 (JP) .................................. 2016-245792
Dec. 19, 2016 (JP) .................................. 2016-245821

(51) Int. Cl.
*G02B 6/38* (2006.01)
*G02B 6/42* (2006.01)

(52) U.S. Cl.
CPC ........... *G02B 6/3861* (2013.01); *G02B 6/382* (2013.01); *G02B 6/3853* (2013.01); *G02B 6/4212* (2013.01); *G02B 6/4239* (2013.01)

(58) Field of Classification Search
CPC .... G02B 6/3861; G02B 6/382; G02B 6/3853; G02B 6/4212; G02B 6/4239
(Continued)

(56) References Cited

U.S. PATENT DOCUMENTS 6,086,704 A * 7/2000 Kanai .................. G02B 6/3861
156/267
6,101,306 A * 8/2000 Engstrand ............ G02B 6/3636
385/137
(Continued)

FOREIGN PATENT DOCUMENTS

CN    102998749 A    3/2013
CN    107209327 A    9/2017
(Continued)

*Primary Examiner* — Jerry M Blevins
(74) *Attorney, Agent, or Firm* — Osha Liang LLP

(57) ABSTRACT

A ferrule that holds an end part of an optical fiber includes a fiber hole into which the optical fiber is inserted and an upper wall part and a lower wall part that define a hollow adhesive filling part, where the lower wall part faces the upper wall part. The adhesive filling part is filled with an adhesive applied between the optical fiber inserted in the fiber hole and an inner wall surface of the adhesive filling part. The upper wall part has an upper opening through which the adhesive passes into the adhesive filling part, and the lower wall part has a lower opening that ventilates the adhesive filling part to outside of the ferrule.

10 Claims, 17 Drawing Sheets

(58) Field of Classification Search
USPC .......................................................... 385/79
See application file for complete search history.

(56) References Cited

U.S. PATENT DOCUMENTS

| | | | |
|---|---|---|---|
| 7,510,337 B2 | 3/2009 | Takeda et al. | |
| 9,063,304 B2 | 6/2015 | Ohta et al. | |
| 9,429,717 B2 | 8/2016 | Nakama et al. | |
| 2006/0093279 A1 | 5/2006 | Plotts | |
| 2008/0317407 A1* | 12/2008 | Popp | G02B 6/3604 |
| | | | 385/26 |
| 2012/0093462 A1 | 4/2012 | Childers et al. | |
| 2013/0071063 A1 | 3/2013 | Aoki et al. | |
| 2014/0321814 A1* | 10/2014 | Chen | G02B 6/32 |
| | | | 385/79 |
| 2015/0023636 A1 | 1/2015 | Moriyama et al. | |
| 2016/0282565 A1 | 9/2016 | Childers et al. | |
| 2016/0341909 A1 | 11/2016 | Childers et al. | |
| 2017/0160492 A1* | 6/2017 | Lin | G02B 6/3839 |

FOREIGN PATENT DOCUMENTS

| | | |
|---|---|---|
| JP | 2003315604 A | 11/2003 |
| JP | 2006047808 A | 2/2006 |
| JP | 2006-515687 A | 6/2006 |
| JP | 2008151843 A | 7/2008 |
| JP | 2012083634 A | 4/2012 |
| JP | 2013064803 A | 4/2013 |
| JP | 5564344 B2 | 7/2014 |
| JP | 2014126741 A | 7/2014 |
| JP | 2015-022130 A | 2/2015 |
| JP | 2016-061847 A | 4/2016 |
| JP | 2016051114 A | 4/2016 |
| JP | 201671194 A | 5/2016 |
| JP | 2016180968 A | 10/2016 |
| JP | WO2016/136484 A1 | 11/2017 |
| TW | 201312187 A | 3/2013 |
| WO | 2016136484 A1 | 9/2016 |
| WO | 2016152246 A1 | 9/2016 |
| WO | 2017/056889 A1 | 4/2017 |

* cited by examiner

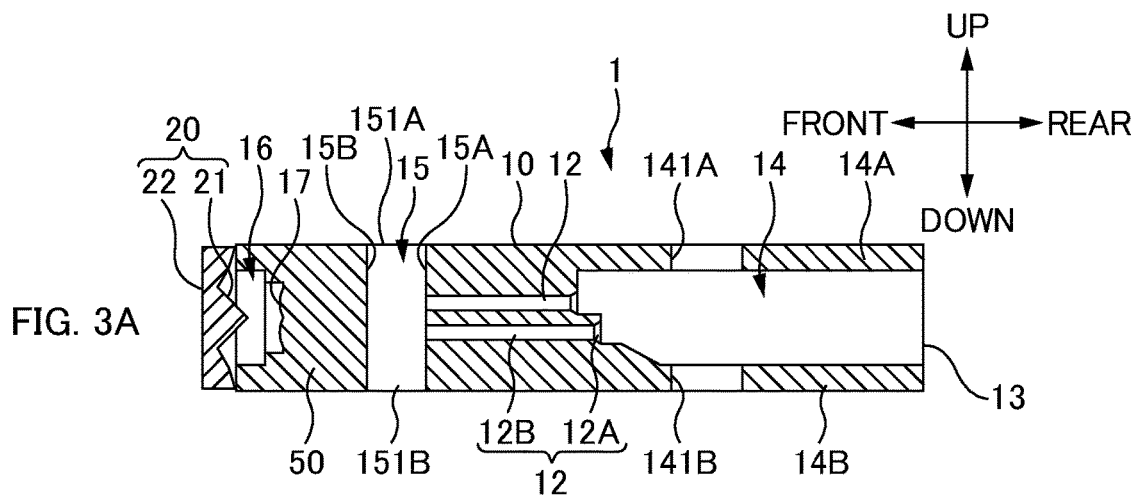
FIG. 3A
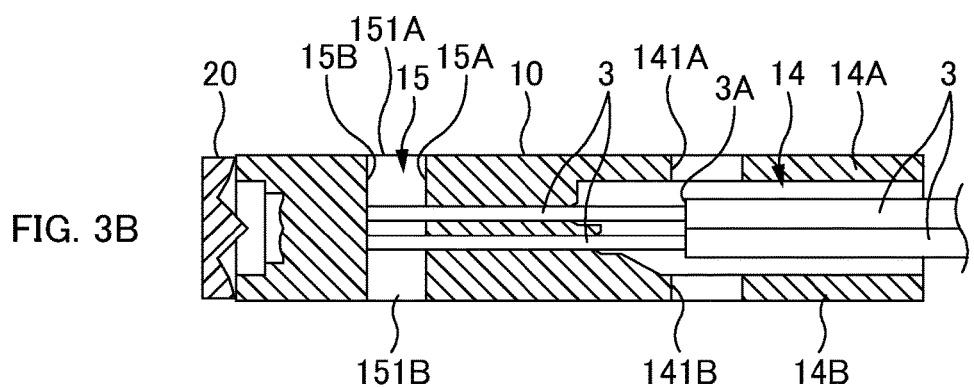
FIG. 3B
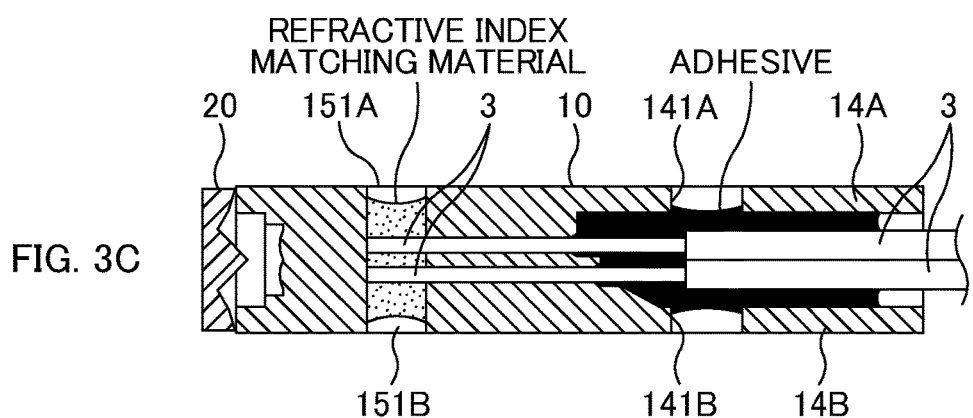
FIG. 3C
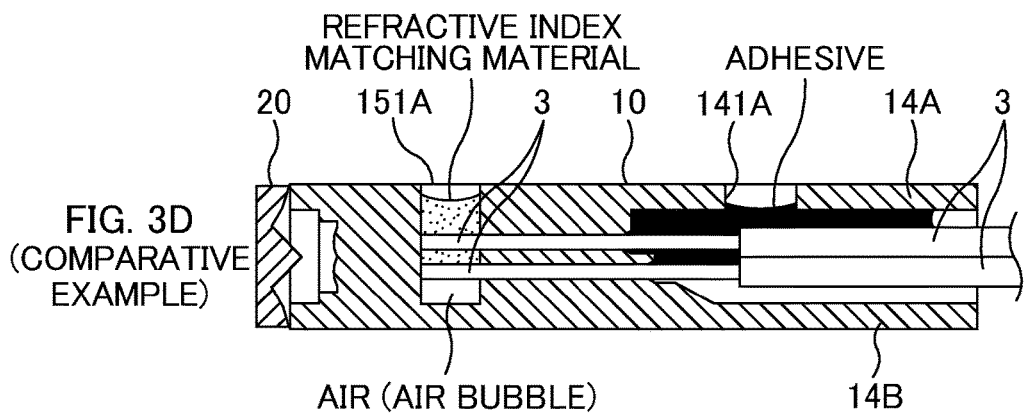
FIG. 3D (COMPARATIVE EXAMPLE)

FERRULE, FERRULE WITH OPTICAL FIBER, AND METHOD OF MANUFACTURING FERRULE WITH OPTICAL FIBER

BACKGROUND

One or more embodiments of the present invention relate to a ferrule, a ferrule with an optical fiber, and a method of manufacturing a ferrule with an optical fiber.

As a ferrule to hold an end part of an optical fiber, a ferrule is known that includes an adhesive filling part provided with an opening for filling an adhesive, to fix an optical fiber by filling an adhesive in the adhesive filling part. Patent Literature 1 discloses that an endface of an optical fiber abuts an inner wall of an adhesive filling part (recess) of a ferrule, and an adhesive fills from an opening of the adhesive filling part, and the adhesive is cured to fix the optical fiber.

CITATION LIST

Patent Literature

Patent Literature 1: JP 5564344B
Patent Literature 2: JP 2008-151843A

SUMMARY

When an adhesive filling part (recess) including an inner wall that allows abutment of an optical fiber is filled with an adhesive, and the adhesive is cured to fix the optical fiber like a ferrule described in Patent Literature 1, the optical fiber is fixed at an end part (bare optical fiber) of the optical fiber from which a sheath is removed. Accordingly, force that fixes the optical fiber to the ferrule is weak, and force that fastens the optical fiber to the ferrule is weak. As a result, when the optical fiber is pulled, an endface of the fiber is detached from the inner wall of the adhesive filling part, which may cause an increase in transmission loss.

Further, when the adhesive filling part (recess) of the ferrule described in Patent Literature 1 is filled with an adhesive, the adhesive is less likely to reach a bottom surface of the adhesive filling part, and air may remain on a lower side of the optical fiber. Particularly, when a plurality of optical fibers are aligned inside the adhesive filling part, the plurality of optical fibers function as obstacles, and thus the adhesive is more likely to build up on an upper side of the optical fibers and is less likely to reach the bottom surface of the adhesive filling part. As a result, the adhesive is not sufficiently applied between the bottom surface of the adhesive filling part and the optical fiber, and thereby force that fixes the optical fiber to the ferrule may become weak, and force that fastens the optical fiber to the ferrule may become weak.

One or more embodiments of the present invention may fix an optical fiber to a ferrule with sufficient fastening force.

One or more embodiments of the present invention are a ferrule for holding an end part of an optical fiber, the ferrule including:

a fiber hole into which the optical fiber is to be inserted;
an adhesive filling part that is surrounded with an upper wall part and a lower wall part facing the upper wall part, and that is to be filled with an adhesive to be applied between the optical fiber inserted in the fiber hole and an inner wall surface of the adhesive filling part;
an upper opening provided in the upper wall part for filling the adhesive in the adhesive filling part; and
a lower opening provided in the lower wall part for ventilation between the adhesive filling part and outside of the ferrule.

Other features of one or more embodiments of the invention are made clear by the following description and the drawings.

Advantageous Effects of Invention

According to one or more embodiments of the present invention, it is possible to fix the optical fiber to the ferrule with sufficient fastening force.

BRIEF DESCRIPTION OF DRAWINGS

FIGS. 3A to 3C are diagrams illustrating a state where optical fibers 3 are fixed to the ferrule 1 according to one or more embodiments. FIG. 3D is an explanatory diagram illustrating a comparative example.

Figure 1A:
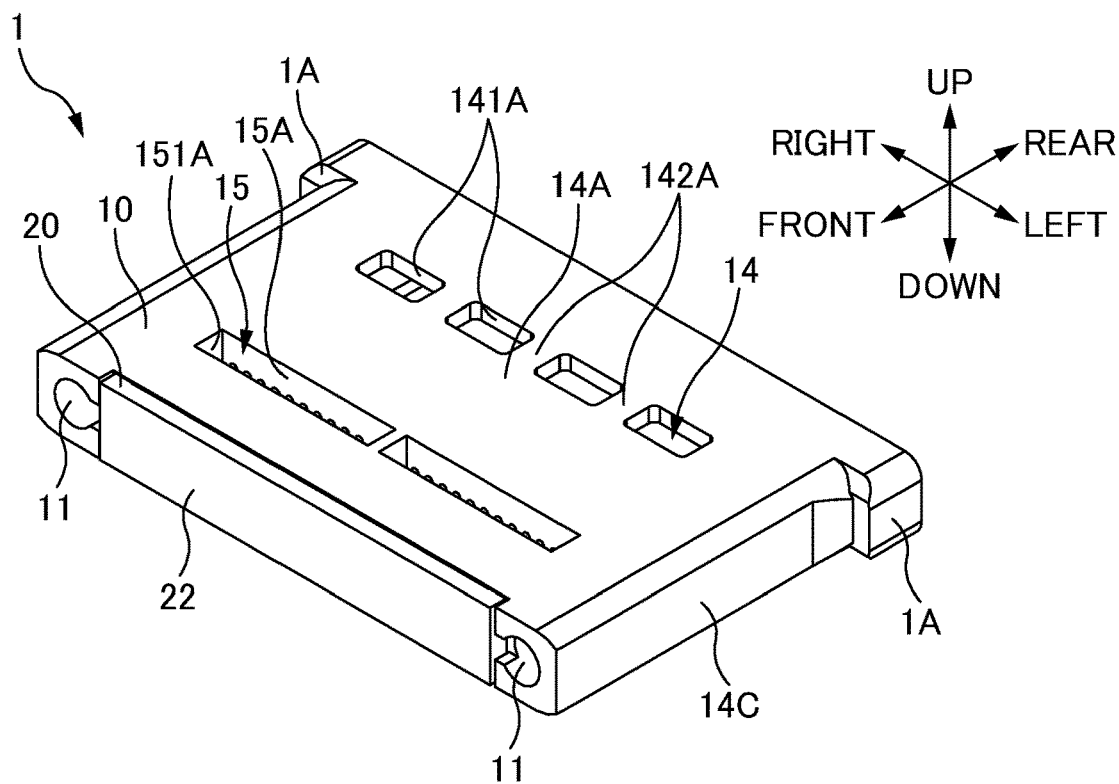
FIGS. 1A and 1B are general perspective views of a ferrule 1 according to one or more embodiments.

DETAILED DESCRIPTION (A) At least the following matters are made clear from the following description and the drawings.

Disclosed in one or more embodiments is a ferrule to hold an end part of an optical fiber, the ferrule including:

a fiber hole into which the optical fiber is to be inserted;

an adhesive filling part that is surrounded with an upper wall part and a lower wall part facing the upper wall part, and that is to be filled with an adhesive to be applied between the optical fiber inserted in the fiber hole and an inner wall surface of the adhesive filling part;

an upper opening provided in the upper wall part for filling the adhesive in the adhesive filling part; and a lower opening provided in the lower wall part for ventilation between the adhesive filling part and outside of the ferrule. With this ferrule, it is possible to fix the optical fiber to the ferrule with sufficient fastening force.

In one or more embodiments, a plurality of the upper openings is provided in the upper wall part, and a rib part is formed between the upper opening and the upper opening. In this way, it is possible to increase strength of the ferrule, and suppress deformation of the ferrule.

In one or more embodiments, the upper opening and the lower opening are arranged to face each other. In this way, it is possible to suppress warping of the ferrule when an adhesive contracts.

In one or more embodiments, the ferrule further includes a recessed part recessed from an endface of the ferrule; and a lens part formed in the recessed part, the lens part being arranged to correspond to the fiber hole. In this way, it is possible to suppress a transmission loss of an optical signal.

In one or more embodiments, the ferrule includes a ferrule body and a prism plate, the ferrule body is provided with the fiber hole, the adhesive filling part, the upper opening, and the lower opening, and the prism plate includes a prism part that is arranged to face the lens part and refracts an optical signal. In this way, it is possible to increase safety.

In one or more embodiments, the ferrule includes a matching material filling part that is to be filled with a refractive index matching material, and the matching material filling part includes an opening surface of the fiber hole inside and an abutment surface that faces the opening surface and allows abutment of an endface of the optical fiber. In this way, it is possible to fill the refractive index matching material between the endface of the optical fiber and the abutment surface, and suppress a transmission loss of an optical signal.

In one or more embodiments, given that a direction of the fiber hole is a front-rear direction, with an endface of the optical fiber abutting the abutment surface, a position in the front-rear direction of a step part of a bare optical fiber part from which a sheath of the optical fiber is removed and the sheath is located between both edges in the front-rear direction of the upper opening. In this way, it is possible to fix the optical fiber to the ferrule with sufficient fastening force.

In one or more embodiments, the matching material filling part includes an upper opening for filling the refractive index matching material inside and a lower opening for ventilation between the matching material filling part and the outside of the ferrule. In this way, it is possible to suppress generation of an air bubble, and suppress a transmission loss of an optical signal.

Disclosed in one or more embodiments is a ferrule with an optical fiber including:

an optical fiber; and a ferrule to hold an end part of the optical fiber, wherein the ferrule includes a fiber hole into which the optical fiber is to be inserted, an adhesive filling part surrounded with an upper wall part and a lower wall part facing the upper wall part, an upper opening provided in the upper wall part for filling an adhesive in the adhesive filling part, and a lower opening provided in the lower wall part for ventilation between the adhesive filling part and the outside of the ferrule, and the optical fiber inserted in the fiber hole is fixed to the ferrule with an adhesive applied between the upper wall part and the lower wall part from the upper opening. With this ferrule with an optical fiber, it is possible to fix the optical fiber to the ferrule with sufficient fastening force.

Disclosed in one or more embodiments is a method of manufacturing a ferrule with an optical fiber including:

(1) preparing a ferrule that includes a fiber hole into which an optical fiber is to be inserted, an adhesive filling part surrounded with an upper wall part and a lower wall part facing the upper wall part, an upper opening provided in the upper wall part for filling an adhesive in the adhesive filling part, and a lower opening provided in the lower wall part for ventilation between the adhesive filling part and outside of the ferrule;

(2) inserting the optical fiber into the fiber hole; and (3) filling the adhesive in the adhesive filling part from the upper opening, applying the adhesive between the optical fiber and an inner wall surface of the adhesive filling part, and fixing the optical fiber to the ferrule with the adhesive. With this manufacturing method, it is possible to fix the optical fiber to the ferrule with sufficient fastening force.

(B) Meanwhile, techniques are known for an optical connector with a lens ferrule in which ferrules face each other, each of the ferrules including a lens on an endface, and optical fibers are thus optically connected to each other. Patent Literature 2 (JP 2008-151843A) discloses that a ferrule body holding an optical fiber and a lens are integrally molded to reduce time and effort of aligning each of the ferrule body and the lens and assembling the ferrule body and the lens.

An optical signal output from a lens needs to be prevented from leaking to the outside of an optical connector with a lens ferrule during a non-connection state of the optical connector in order to improve safety. Thus, an optical path conversion plate that converts an optical path of an optical signal during the non-connection state of the optical connector and prevents light from leaking to the outside of a housing of the optical connector may be attached to a tip of a ferrule body in addition to the ferrule body integrally molded with the lens. Such attachment of the optical path conversion plate to the ferrule body requires positioning with a high degree of precision.

Thus, positioning of an optical path conversion plate to a ferrule body has been performed while performing active aligning by using a CCD camera and the like. A device such as a CCD camera and a jig that handles a ferrule and the like are separately needed to perform such active aligning, which results in enormous amounts of time, effort, and cost.

Thus, one or more embodiments of the present disclosure may provide a ferrule for an optical connector including a positioning part capable of easily performing positioning with a high degree of precision without a need for additional device, jig, and the like when an optical path conversion part is attached to a ferrule body part.

A primary aspect of one or more embodiments of the invention may be a ferrule for an optical connector being one of a pair of ferrules for an optical connector that optically connect optical fibers to each other, the ferrule for an optical connector including: a ferrule body part that integrally includes a lens part receiving an input and an output of an optical signal transmitted by the optical fiber and also holds an end part of the optical fiber; and an optical path conversion part that forms a first optical path of the optical signal to optically connect the optical fibers to each other when the pair of ferrules for an optical connector are connected to each other, and forms a second optical path in which the optical signal is not emitted to the outside of the ferrule for an optical connector when the pair of ferrules for an optical connector are not connected to each other, wherein the ferrule for an optical connector is provided with a positioning part that performs positioning of the optical path conversion part with respect to the ferrule body part such that the optical signal passes through the first optical path and the second optical path.

At least the following matters are made clear from the following description and the drawings.

Disclosed in one or more embodiments is a ferrule for an optical connector being one of a pair of ferrules for an optical connector that optically connect optical fibers to each other, the ferrule for an optical connector including: a ferrule body part that integrally includes a lens part receiving an input and an output of an optical signal transmitted by the optical fiber and also holds an end part of the optical fiber; and an optical path conversion part that forms a first optical path of the optical signal to optically connect the optical fibers to each other when the pair of ferrules for an optical connector are connected to each other, and forms a second optical path in which the optical signal is not emitted to the outside of the ferrule for an optical connector when the pair of ferrules for an optical connector are not connected to each other, wherein the ferrule for an optical connector is provided with a positioning part that performs positioning of the optical path conversion part with respect to the ferrule body part such that the optical signal passes through the first optical path and the second optical path. With this ferrule for an optical connector, it is possible to easily perform positioning with a high degree of precision without a need for additional device, jig, and the like when the optical path conversion part is attached to the ferrule body part.

In one or more embodiments, the optical path conversion part includes a prism arranged to face the lens part, and the positioning part performs positioning by a fit between a body-side positioning part formed in the ferrule body part and the prism. In this way, it is possible to easily perform positioning with a high degree of precision without a need for additional device, jig, and the like when the optical path conversion part is attached to the ferrule body part.

In one or more embodiments, the body-side positioning part is a V-shaped groove, the prism is provided with a light incidence/emission surface to which and from which an optical signal before or after passing through the lens part is incident and emitted and that has a predetermined angle with respect to an optical axis of the optical signal, and the positioning part performs positioning by a fit between a protruding part of the prism formed on the light incidence/emission surface and the V-shaped groove. In this way, it is possible to easily perform positioning with a high degree of precision without a need for additional device, jig, and the like when the optical path conversion part is attached to the ferrule body part.

In one or more embodiments, the optical path conversion part includes a prism arranged to face the lens part and a pair of ribs arranged on both sides of the prism, and the positioning part performs positioning by a fit between a recessed part formed in the ferrule body part and the pair of ribs. In this way, it is possible to easily perform positioning with a high degree of precision without a need for additional device, jig, and the like when the optical path conversion part is attached to the ferrule body part.

In one or more embodiments, the positioning part performs positioning by a fit of side surfaces of the pair of ribs to an inner surface of the recessed part. In this way, it is possible to easily perform positioning with a high degree of precision without a need for additional device, jig, and the like when the optical path conversion part is attached to the ferrule body part.

In one or more embodiments, the positioning part performs positioning by bringing the pair of ribs into contact with a peripheral part of the recessed part so as to sandwich the peripheral part of the recessed part. In this way, it is possible to easily perform positioning with a high degree of precision without a need for additional device, jig, and the like when the optical path conversion part is attached to the ferrule body part.

In one or more embodiments, a surface in which the pair of ribs contacts a peripheral part of the recessed part is inclined to a direction in which the optical path conversion part is attached to the ferrule body part. In this way, it is possible to easily perform positioning with a high degree of precision without a need for additional device, jig, and the like when the optical path conversion part is attached to the ferrule body part.

In one or more embodiments, the ferrule body part and the optical path conversion part each include a ferrule hole in which a guide pin formed in the other ferrule for an optical connector is inserted, and the positioning part performs positioning by inserting the guide pins through both of the ferrule holes. In this way, it is possible to easily perform positioning with a high degree of precision without a need for additional device, jig, and the like when the optical path conversion part is attached to the ferrule body part.

Configuration

Figure 1B:
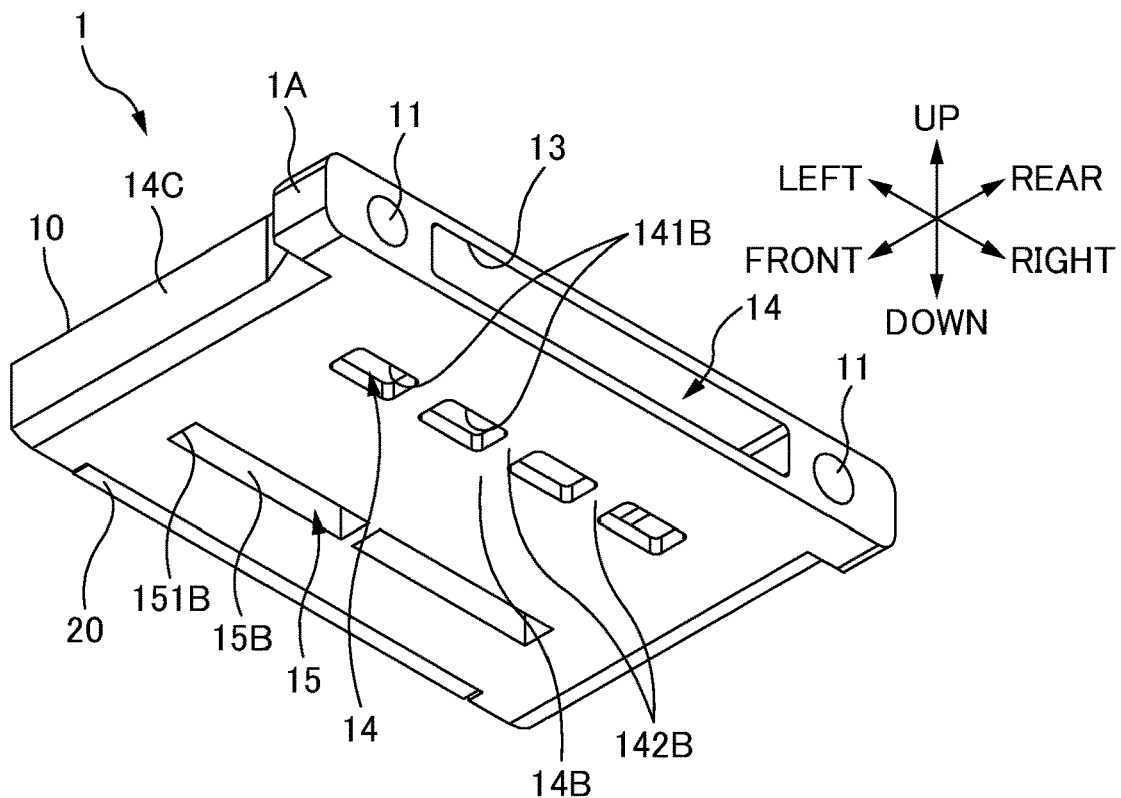
Figure 2:
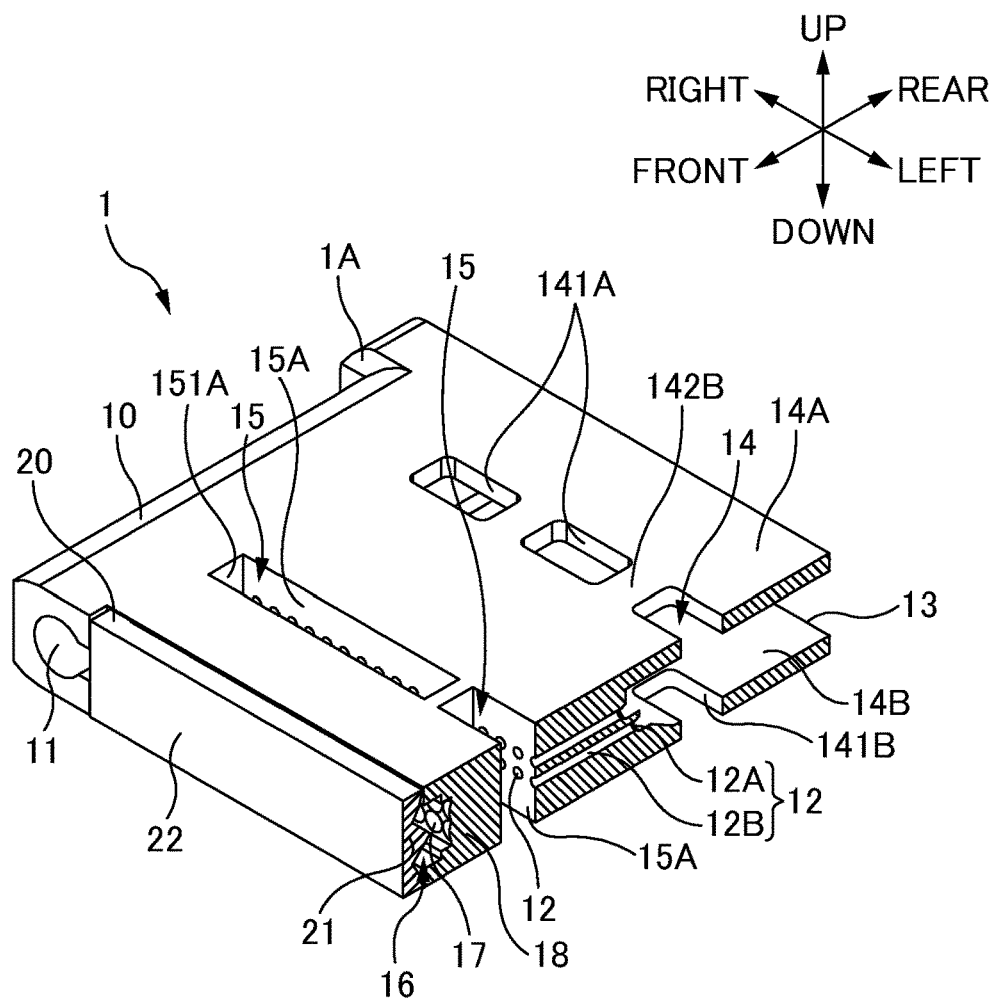
FIG. 2 is a cut perspective view of the ferrule 1 according to one or more embodiments.

FIGS. 1A and 1B are general perspective views of a ferrule 1 according to one or more embodiments. FIG. 2 is a cut perspective view of the ferrule 1 according to one or more embodiments.

In the following description, directions will be defined as illustrated in the drawings. Specifically, a direction of a fiber hole 12 is a "front-rear direction", a side of an endface of an optical fiber 3 inserted in the fiber hole 12 is "front", and an opposite side is "rear". Further, a direction in which two guide holes 11 of the ferrule 1 are aligned is a "left-right direction", a right side when a front side is seen from a rear side is "right", and an opposite side is "left". Further, a direction perpendicular to the front-rear direction and the left-right direction is an "up-down direction", a side of an opening (an upper opening 141A) for filling an adhesive in an adhesive filling part 14 is "up", and an opposite side is "down".

The ferrule 1 is a member for holding an end part of the optical fiber 3 and optically connecting the optical fiber 3 to another optical component. The ferrule 1 includes a flange part 1A protruding outward from an outer surface of the ferrule 1. The ferrule 1 in one or more embodiments includes a ferrule body 10 and a prism plate 20. However, as described later, the ferrule 1 may not include the prism plate 20.

The ferrule body 10 includes the guide holes 11, fiber holes 12, a fiber insertion opening 13, the adhesive filling part 14 (first filling part), a matching material filling part 15 (second filling part), a recessed part 16, a lens part 17, and a light transmission part 18.

Each of the guide holes 11 is a hole into which a guide pin (not illustrated) is to be inserted. The guide pin is inserted in the guide hole 11, and thus ferrules 1 are aligned with each other. The guide hole 11 penetrates the ferrule 1 along the front-rear direction. The two guide holes 11 are opened in a connecting endface of the ferrule 1. The two guide holes 11 are arranged at an interval in the left-right direction so as to sandwich the recessed part 16 in the left-right direction.

Each of the fiber holes 12 is a hole into which the optical fiber 3 is to be inserted. The fiber hole 12 is also a hole for positioning the optical fiber 3. The fiber hole 12 penetrates the adhesive filling part 14 and the matching material filling part 15. A bare optical fiber in which a sheath is removed from a coated optical fiber is inserted in the fiber hole 12. The fiber hole 12 is formed along the front-rear direction.

A plurality of the fiber holes 12 are formed in the ferrule 1. The plurality of fiber holes 12 are aligned in the left-right direction. The optical fibers 3 constituting an optical fiber tape (optical fiber ribbon) are inserted in respective fiber holes 12 aligned in the left-right direction. In one or more embodiments, two columns of the fiber holes 12 aligned in the left-right direction are provided. These two columns are aligned in the up-down direction. However, a single column of the fiber holes 12 may be formed in the ferrule 1, or three or more columns may be formed.

Each of the fiber holes 12 includes a tapered part 12A and a fiber fixing part 12B. The tapered part 12A is provided in a rear end part of the fiber hole 12, and has a tapered shape widening toward the rear side. The fiber hole 12 includes the tapered part 12A, which facilitates insertion of the optical fiber 3 into the fiber hole 12. The fiber fixing part 12B is provided on a front side with respect to the tapered part 12A, and has substantially the same diameter as a diameter of the optical fiber 3. In this way, the optical fiber 3 inserted in the fiber hole 12 can be positioned.

The fiber insertion opening 13 is an opening formed in a rear endface of the ferrule 1. The optical fiber 3 is inserted into the ferrule 1 from the fiber insertion opening 13. The fiber insertion opening 13 is formed to be longer in the left-right direction than a width of the optical fiber tape (optical fiber ribbon). Thus, a width in the left-right direction of the fiber insertion opening 13 is longer than a length at which the plurality of fiber holes 12 is aligned in the left-right direction.

The adhesive filling part 14 is a hollow part to be filled with an adhesive. An adhesive for fastening the optical fiber 3 to the ferrule 1 fills the adhesive filling part 14. The adhesive fills the adhesive filling part 14, and is thus applied between an inner wall surface of the adhesive filling part 14 and the optical fiber 3. This adhesive is cured to fix the optical fiber 3 to the ferrule 1. The adhesive filling part 14 is formed to be longer in the left-right direction than a width of the optical fiber tape (optical fiber ribbon) constituted by the plurality of optical fibers 3 inserted in the fiber holes 12 aligned in the left-right direction. Thus, a width in the left-right direction of the adhesive filling part 14 is longer than a length at which the plurality of fiber holes 12 are aligned in the left-right direction.

The adhesive filling part 14 is a hollow part surrounded with (i.e., defined by) an upper wall part 14A, a lower wall part 14B (bottom wall part), and a pair of side wall parts 14C. The adhesive filling part 14 is open in the rear endface of the ferrule 1, and this opening is the fiber insertion opening 13. The fiber holes 12 (tapered parts 12A) are opened in a front wall part of the adhesive filling part 14.

Upper openings 141A and upper rib parts 142A are formed in the upper wall part 14A constituting the adhesive filling part 14. Each of the upper openings 141A is a through hole formed in the upper wall part 14A, and includes a function as an adhesive filling window (opening) for filling an adhesive in the adhesive filling part 14. A plurality of upper openings 141A are formed in the upper wall part 14A, and the upper rib part 142A is formed at each portion between the upper opening 141A and the upper opening 141A. One long narrow upper opening 141A can be formed in the left-right direction instead of forming the plurality of upper openings 141A in the upper wall part 14A. However, in this case, strength of the ferrule 1 decreases, and the ferrule body 10 may become deformed when the ferrule body 10 is pulled out of a die during injection molding. Thus, in one or more embodiments, the plurality of upper openings 141A are aligned in the left-right direction, and the upper rib part 142A is also arranged between the upper opening 141A and the upper opening 141A in order to increase strength of the ferrule 1.

Lower openings 141B and lower rib parts 142B are formed in the lower wall part 14B constituting the adhesive filling part 14. Each of the lower openings 141B is a through hole formed in the lower wall part 14B, and includes a function of allowing air to pass between the adhesive filling part 14 and the outside of the ferrule 1. As described later, by providing the lower openings 141B, an adhesive filling the adhesive filling part 14 from the upper openings 141A can be more likely to reach an inner wall surface of the lower wall part 14B (a bottom surface of the adhesive filling part 14), and thereby the adhesive can be sufficiently applied between the inner wall surface of the lower wall part 14B and the optical fiber 3, and the optical fiber 3 can be fixed to the ferrule 1 with sufficient fastening force (described later). A plurality of lower openings 141B are formed in the lower wall part 14B, and the lower rib part 142B is formed at each portion between the lower opening 141B and the lower opening 141B. Note that one long narrow lower opening 141B can be formed in the left-right direction instead of forming the plurality of lower openings 141B in the lower wall part 14B. However, in this case, strength of the ferrule 1 decreases, and the ferrule body 10 may become deformed when the ferrule body 10 is pulled out of a die during injection molding. Thus, in one or more embodiments, the plurality of lower openings 141B are aligned in the left-right direction, and the lower rib part 142B is also arranged between the lower opening 141B and the lower opening 141B in order to increase strength of the ferrule 1.

In one or more embodiments, the upper opening 141A and the lower opening 141B are arranged to face each other. In other words, the upper opening(s) 141A and the lower opening (s) 141B are symmetrically arranged up and down in one or more embodiments. In this way, the upper wall part 14A and the lower wall part 14B of the ferrule 1 have substantially the same strength, and thus such deformation that the ferrule 1 is warped can be suppressed even when the adhesive filling the adhesive filling part 14 contracts during curing. Note that, in a case where the upper opening 141A and the lower opening 141B are arranged asymmetrically, the ferrule 1 may become deformed so as to be warped when the adhesive filling the adhesive filling part 14 contracts.

The matching material filling part 15 is a hollow part for filling a refractive index matching material. The matching material filling part 15 is filled with an adhesive including a function as a refractive index matching material, but an adhesive may not be used as long as a refractive index matching material is used. The matching material filling part 15 is formed to be longer in the left-right direction than a width of the optical fiber tape (optical fiber ribbon) constituted by the plurality of optical fibers 3 inserted in the fiber holes 12 aligned in the left-right direction. Thus, a width in the left-right direction of the matching material filling part 15 is longer than a length at which the plurality of fiber holes 12 are aligned in the left-right direction.

The matching material filling part 15 includes a fiber hole opening surface 15A and an abutment surface 15B. The fiber hole opening surface 15A is an inner wall surface on the rear side of the matching material filling part 15. The plurality of fiber holes 12 are aligned in the left-right direction and opened in the fiber hole opening surface 15A. The abutment surface 15B is an inner wall surface on the front side of the matching material filling part 15 and is a counter surface facing the fiber hole opening surface 15A. The abutment surface 15B is a surface that faces the openings of the fiber holes 12 in the fiber hole opening surface 15A, and allows abutment of the endfaces of the optical fibers 3.

The matching material filling part 15 includes upper openings 151A and lower openings 151B. Each of the upper opening 151A is a portion opened in the upper surface of the ferrule body 10, and includes a function as a filling window for filling a refractive index matching material in the matching material filling part 15. Each of the lower opening 151B is a portion opened in the lower surface of the ferrule body 10, and includes a function of allowing air to pass between the matching material filling part 15 and the outside of the ferrule 1. The matching material filling part 15 may be opened only with the upper openings 151A without the lower openings 151B being provided. However, in this case, a refractive index matching material is more likely to build up on the upper side of the optical fibers 3. As a result, the refractive index matching material is less likely to reach a bottom surface of the matching material filling part 15, and an air bubble is more likely to be formed in the matching material filling part 15. Further, an air layer (air bubble) is more likely to be formed in the endfaces of the optical fibers 3 with an air bubble formed in the matching material filling part 15, and a loss of an optical signal may increase.

The recessed part 16 is a portion being recessed with respect to a front endface of the ferrule body 10. The recessed part 16 is provided between the two guide holes 11 in the front endface of the ferrule body 10. The recessed part 16 is formed into a long narrow rectangular shape in the left-right direction so as to correspond to the plurality of fiber holes 12.

The lens part 17 is provided on a bottom surface (rear side surface) of the recessed part 16. The lens part 17 is arranged so as to correspond to each of the plurality of optical fibers 3 (in other words, the plurality of fiber holes 12), and an optical signal is input and output via the lens part 17. The lens part 17 is formed so as to function as, for example, a collimating lens. A transmission loss of an optical signal can be suppressed by inputting and outputting the optical signal having a diameter magnified by the lens part 17.

The light transmission part 18 is a portion (portion in which an optical path is formed) that allows an optical signal to be transmitted between the front endface (specifically, the lens part 17) of the ferrule body 10 and the abutment surface 15B of the matching material filling part 15. Note that the ferrule body 10 is integrally molded with transparent resin that allows transmission of an optical signal in one or more embodiments, but at least the light transmission part 18 being an optical path may allow transmission of an optical signal, and a portion other than the light transmission part 18 may be constituted by a different material (material that does not allow transmission of an optical signal).

Figure 4A:
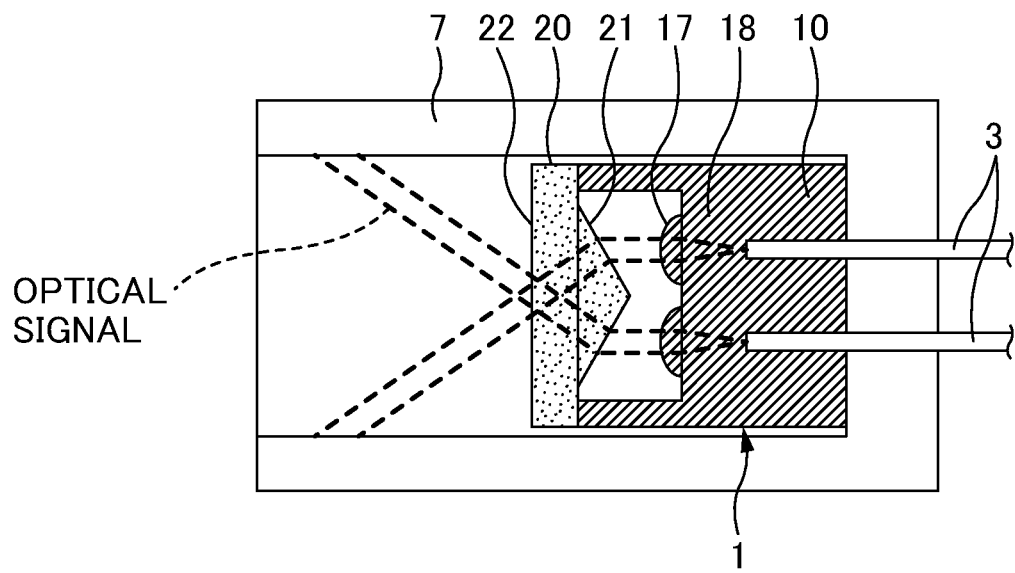
FIG. 4A is an explanatory diagram illustrating an optical connector 5 using the ferrule 1 (or the ferrule 1 with an optical fiber) according to one or more embodiments.
Figure 4B:
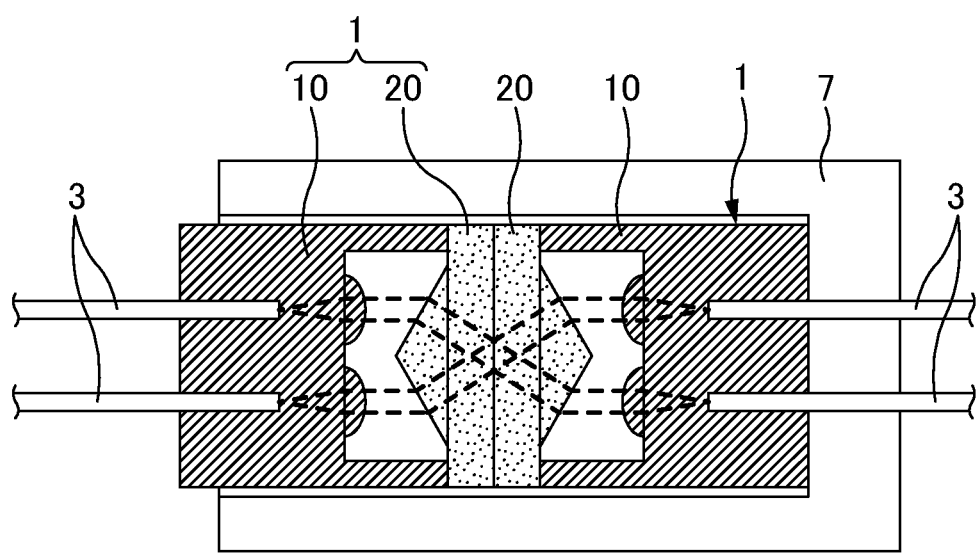
FIG. 4B is an explanatory diagram illustrating a state where ferrules 1 according to one or more embodiments are connected to each other.

The prism plate 20 is an optical member for refracting an optical signal. The prism plate 20 includes a prism part 21 and a flat surface part 22. The prism part 21 is a portion constituted by inclination surfaces inclined to the front-rear direction and is a portion that refracts an optical signal. The inclination surfaces constituting the prism part 21 are arranged to face the lens part 17 in the front-rear direction. In one or more embodiments, the prism part 21 includes the inclination surfaces inclined in directions opposite to each other, and a central part (top part) in the up-down direction of the prism part 21 protrudes toward the rear. The flat surface part 22 is a portion constituted by a flat surface perpendicular to the front-rear direction, and is a surface to which and from which an optical signal is input and output. As illustrated in FIG. 4A described later, optical signals emitted in parallel with the front-rear direction from the lens part 17 are refracted by the prism part 21, and are then emitted from the flat surface part 22 in a direction(s) inclined to the front-rear direction. As illustrated in FIG. 4B described later, optical signals incident on the flat surface part 22 from a direction(s) inclined to the front-rear direction are refracted in the front-rear direction by the prism part 21 to be in parallel, and is then incident on the lens part 17.

The prism plate 20 is fixed to the front endface of the ferrule body 10 such that the prism part 21 faces the rear side (the side of the ferrule body 10) (cf. FIG. 2). In one or more embodiments, the top part of the prism part 21 is embedded in the recessed part 16 of the ferrule body 10. In this way, the prism part 21 can be brought close to the lens part 17 as much as possible, and the ferrule 1 can be reduced in size.

Method of Fixing Optical Fiber 3

FIGS. 3A to 3C are diagrams illustrating a state where the optical fibers 3 are fixed to the ferrule 1 according to one or more embodiments. These diagrams illustrate cross-sectional views of the ferrule 1 according to one or more embodiments. Note that FIG. 3C illustrates the ferrule 1 with an optical fiber.

First, as illustrated in FIG. 3A, the ferrule 1 is prepared. Then, the ferrule 1 is set in a jig (not illustrated). Note that this jig is constituted so as not to cover the lower openings 141B and the lower openings 151B in the lower surface of the ferrule 1 for ventilation.

Next, preprocessing of the optical fibers 3 is performed. Specifically, a sheath of each of the optical fibers 3 (coated optical fiber) of an optical fiber tape is removed, and an end part of the optical fiber 3 is cut such that a bare optical fiber from which the sheath is removed has a predetermined length.

Next, as illustrated in FIG. 3B, the optical fibers 3 are inserted into the fiber holes 12, and the endfaces of the optical fibers 3 abut the abutment surface 15B. At this time, after the endface of each optical fiber 3 protrudes from the fiber hole opening surface 15A and before the endface of the optical fiber 3 abuts the abutment surface 15B, air cleaning is preferably performed on the matching material filling part 15 to clean the endface of the optical fiber 3. In this way, dust and the like adhering to the endface of the optical fiber 3 when the optical fiber 3 passes through the fiber hole 12 can be removed.

In one or more embodiments, when the endface of the optical fiber 3 abuts the abutment surface 15B, as illustrated in FIG. 3B, an end part (a step part 3A between a bare optical fiber part from which a sheath is removed and the sheath) of the sheath of the optical fiber 3 is arranged below the upper opening 141A of the adhesive filling part 14. In other words, in one or more embodiments, the upper opening 141A is formed such that a front edge of the upper opening 141A is located toward the front with respect to the step part 3A of the optical fiber 3 having the endface abutting the abutment surface 15B, and a rear edge of the upper opening 141A is located toward the rear with respect to the step part 3A of the optical fiber 3 having the endface abutting the abutment surface 15B. That is, when the endface of the optical fiber 3 abuts the abutment surface 15B, as illustrated in FIG. 3B, a position in the front-rear direction of the step part 3A of the optical fiber 3 is located between both edges in the front-rear direction of the upper opening 141A of the adhesive filling part 14. Note that, in a case where the front edge of the upper opening 141A is located toward the rear with respect to the step part 3A of the optical fiber 3, only the optical fiber 3 of a portion with a sheath is arranged below the upper opening 141A. Because there is hardly a gap of the optical fiber 3 below the upper opening 141A and an adhesive is also less likely to reach a bare optical fiber (this bare optical fiber is located toward the front with respect to the upper opening 141A) having a great gap, the plurality of optical fibers 3 function as obstacles, and the adhesive is more likely to build up on the upper side of the plurality of optical fibers 3 and is less likely to reach the inner wall surface of the lower wall part 14B (the bottom surface of the adhesive filling part 14). Further, in a case where the rear edge of the upper opening 141A is located toward the front with respect to the step part 3A of the optical fiber 3, only a bare optical fiber is arranged below the upper opening 141A, and thus a gap of the optical fiber 3 below the upper opening 141A is great. As a result, an adhesive is more likely to leak from the lower opening 141B.

Next, as illustrated in FIG. 3C, the adhesive filling part 14 is filled with an adhesive from the upper opening 141A, and the matching material filling part 15 is also filled with a refractive index matching material from the upper opening 151A.

The adhesive filling from the upper opening 141A of the adhesive filling part 14 first permeates and is applied between the inner wall surface of the upper wall part 14A and the optical fibers 3. Further, the adhesive filling from the upper opening 141A of the adhesive filling part 14 reaches the inner wall surface of the lower wall part 14B (the bottom surface of the adhesive filling part 14) through a gap between the bare optical fibers. At this time, the lower opening 141B of the adhesive filling part 14 functions as a vent hole, and thus the adhesive is less likely to build up on the upper side of the plurality of optical fibers 3 and is more likely to reach the inner wall surface of the lower wall part 14B (the bottom surface of the adhesive filling part 14). In this way, the adhesive is sufficiently applied between the inner wall surface of the lower wall part 14B and the optical fibers 3. Further, the lower opening 141B of the adhesive filling part 14 functions as a vent hole, and thus the adhesive is more likely to reach the lower side. Accordingly, there is also an advantage in that time until the adhesive is sufficiently applied between the inner wall surface of the lower wall part 14B and the optical fibers 3 can be shortened.

In one or more embodiments, the lower opening 141B of the adhesive filling part 14 functions as a vent hole, and thus the adhesive is more likely to reach the lower side. Accordingly, the adhesive having viscosity of about 50 cp can be used. Note that, in a case where the lower opening 141B is not provided, the adhesive is less likely to reach the lower side, and thus the adhesive having viscosity of, for example, less than or equal to 5 cp needs to be used. Therefore, the adhesive filling the adhesive filling part 14 preferably has viscosity of less than or equal to 50 cp in one or more embodiments.

The refractive index matching material filling from the upper opening 151A of the matching material filling part 15 fills the inside of the matching material filling part 15 through a gap between the optical fibers 3, and permeates through a gap between the endfaces of the optical fibers 3 and the abutment part. At this time, the lower opening 151B of the matching material filling part 15 functions as a vent hole, and thus the refractive index matching material is less likely to build up on the upper side of the plurality of optical fibers 3, and an air bubble is less likely to be formed on the lower side of the optical fibers 3 (air is less likely to remain on the lower side of the optical fibers 3). Further, the lower opening 151B of the matching material filling part 15 functions as a vent hole, and thus the refractive index matching material is more likely to reach the lower side of the optical fibers 3. Accordingly, there is also an advantage in that time for filling the refractive index matching material can be shortened.

After the adhesive fills the adhesive filling part 14 as in FIG. 3C, the adhesive is cured by heating the ferrule 1. In one or more embodiments, the adhesive is sufficiently applied between the inner wall surfaces (particularly, the inner wall surfaces of the upper wall part 14A and the lower wall part 14B) of the adhesive filling part 14 and the optical fibers 3, and thus the optical fibers 3 can be fixed to the ferrule 1 with sufficient fastening force after curing of the adhesive. When the refractive index matching material is constituted by the adhesive, the refractive index matching material is also cured during curing of the adhesive of the adhesive filling part 14. Note that the adhesive (and the refractive index matching material) may be ultraviolet curable resin instead of thermosetting resin. In this case, when the adhesive is cured, ultraviolet light is used for irradiation instead of heat application. The adhesive is cured in such a manner to fix the optical fibers 3 to the ferrule 1, and the ferrule 1 with an optical fiber is thus manufactured.

FIG. 3D is an explanatory diagram illustrating a comparative example. In the comparative example, the lower opening 141B is not formed in the lower wall part 14B of the adhesive filling part 14. Thus, the plurality of optical fibers 3 function as obstacles, and an adhesive filling from the upper opening 141A is more likely to build up on the upper side of the plurality of optical fibers 3 and is less likely to reach the inner wall surface of the lower wall part 14B (the bottom surface of the adhesive filling part 14). Also, in the comparative example, no lower opening 151B is formed in the matching material filling part 15. Thus, the plurality of optical fibers 3 function as obstacles, and a refractive index matching material filling from the upper opening 151A is more likely to build up on the upper side of the plurality of optical fibers 3, and air remains on the lower side of the optical fibers 3. Accordingly, an air layer is more likely to be formed between the endfaces of the optical fibers 3 and the abutment surface 15B, and a loss of an optical signal may increase.

Optical Connector 5 Using Ferrule 1

FIG. 4A is an explanatory diagram illustrating an optical connector 5 using the ferrule 1 (or the ferrule 1 with an optical fiber) according to one or more embodiments.

The optical connector 5 includes the above-described ferrule 1 and a housing 7. The housing 7 is a member that houses the above-described ferrule 1. A wall surface of the housing 7 is formed so as to protrude forward with respect to the ferrule 1.

An optical signal emitted from the endface of the optical fiber 3 becomes collimated light having a diameter magnified by the lens part 17 of the ferrule 1, and is emitted in parallel with the front-rear direction from the lens part 17 toward a lens plate. The optical signal emitted in parallel with the front-rear direction from the lens part 17 is refracted by the prism part 21, and is then emitted from the flat surface part 22 in a direction inclined to the front-rear direction. The optical signal emitted from the flat surface part 22 is applied to the wall surface (inner wall surface) of the housing 7, and is prevented from leaking to the outside of the optical connector 5. In this way, the optical signal can be prevented from being applied to a human eye, and the safe optical connector 5 can be provided.

FIG. 4B is an explanatory diagram illustrating a state where ferrules 1 according to one or more embodiments are connected to each other. In FIG. 4B, the ferrules 1 arranged to face each other are illustrated. It is illustrated herein that the flat surface parts 22 of the prism plates 20 contact each other, but the flat surface parts 22 of the prism plates 20 do not have to contact each other.

An optical signal emitted from the flat surface part 22 of one of the ferrules 1 in a direction(s) inclined to the front-rear direction is incident on the flat surface part 22 of the other of the ferrules 1, is refracted with the front-rear direction by the prism part 21 of the other of the ferrules 1 to be in parallel, and is then incident on the lens part 17. The optical signal (collimated light) incident on the lens part 17 becomes convergent light by the lens part 17, and is then incident on the endface of the optical fiber 3.

As described above, even in a state where an inclined optical signal is emitted from the ferrule 1 illustrated in FIG. 4A, and the optical signal is applied to the side wall of the housing 7, the optical fibers 3 can be optically connected to each other by arranging the ferrules 1 in one or more embodiments to face each other as illustrated in FIG. 4B.

Modification Examples

Figure 5:
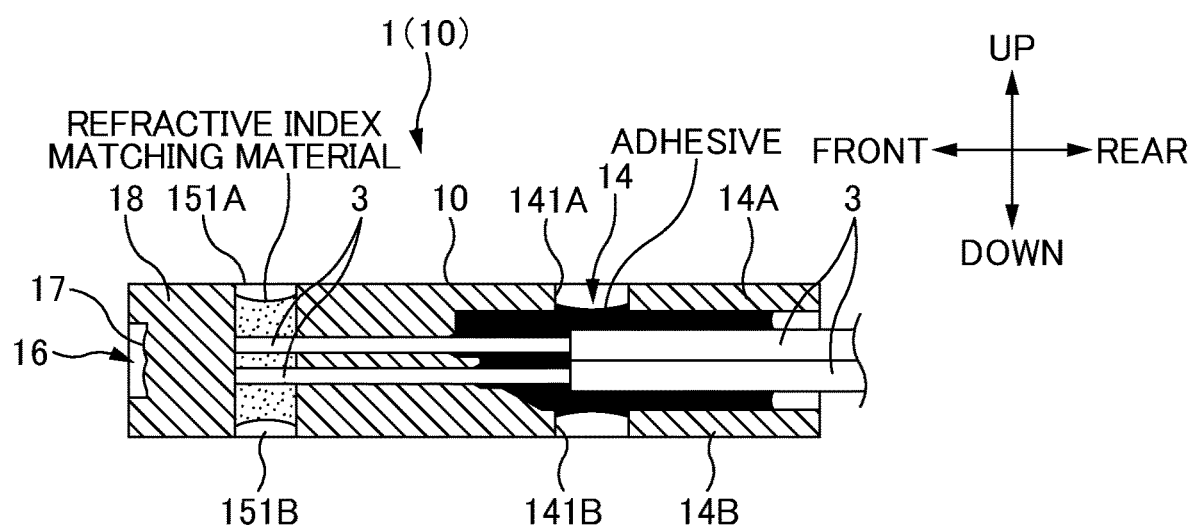
FIG. 5 is a cross-sectional view of a first modification example of the ferrule 1 according to one or more embodiments.

FIG. 5 is a cross-sectional view of a first modification example of the ferrule 1 according to one or more embodiments. In the above-described one or more embodiments, the ferrule 1 is constituted by the ferrule body 10 and the prism plate 20, but a ferrule 1 in the first modification example does not include the prism plate 20 (is constituted by only the ferrule body 10).

Figure 6:
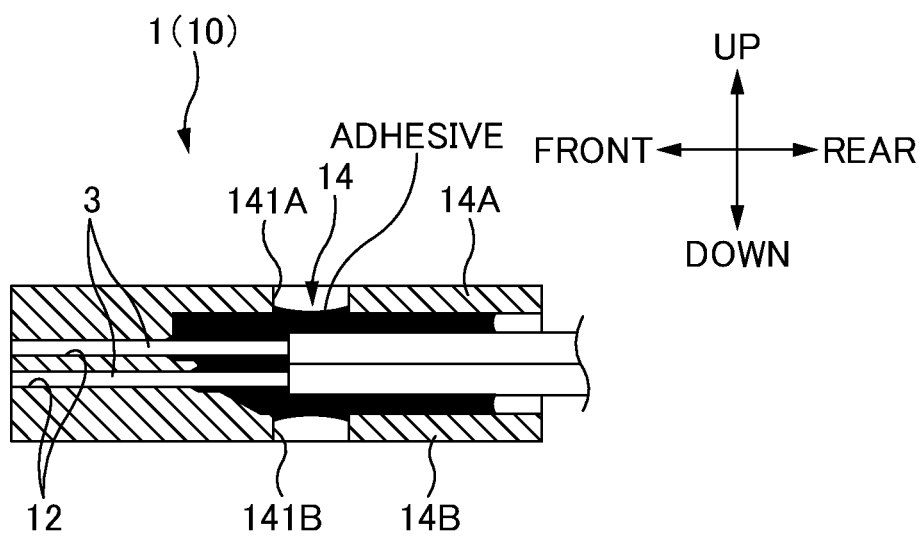
FIG. 6 is a cross-sectional view of a second modification example of the ferrule 1 according to one or more embodiments.

FIG. 6 is a cross-sectional view of a second modification example of the ferrule 1 according to one or more embodiments. In the above-described one or more embodiments, the ferrule 1 includes the matching material filling part 15 to be filled with a refractive index matching material, and the optical fibers 3 abut the abutment surface 15B being the inner wall surface of the matching material filling part 15. In contrast, a ferrule 1 in the second modification example does not include the matching material filling part 15, does not thus include the abutment surface 15B, and has a configuration in which the endfaces of the optical fibers 3 are exposed from the front endface of the ferrule 1. For the ferrule 1 in the second modification example, endfaces of ferrules 1 face each other, and the endfaces of the optical fibers 3 physically contact each other to be optically connected to each other.

Also in the first modification example and the second modification example, the ferrule 1 includes the fiber holes 12, the adhesive filling part 14, the upper openings 141A for filling an adhesive in the adhesive filling part 14, and the lower openings 141B. Also in the first modification example and the second modification example, the adhesive filling from the upper openings 141A of the adhesive filling part 14 first permeates and is applied between the inner wall surface of the upper wall part 14A and the optical fibers 3. At this time, the lower openings 141B of the adhesive filling part 14 function as vent holes, and thus the adhesive is less likely to build up on the upper side of the plurality of optical fibers 3 and is more likely to reach the inner wall surface of the lower wall part 14B (the bottom surface of the adhesive filling part 14). In this way, the adhesive is sufficiently applied between the inner wall surface of the lower wall part 14B and the optical fibers 3. Thus, also in the first modification example and the second modification example, the adhesive can be sufficiently applied between the inner wall surfaces (particularly, the inner wall surfaces of the upper wall part 14A and the lower wall part 14B) of the adhesive filling part 14 and the optical fibers 3, and thus the optical fibers 3 can be fixed to the ferrule 1 with sufficient fastening force.

A ferrule 1 in one or more embodiments includes a reflecting part 19. An optical signal is reflected by the reflecting part 19 to transmit the optical signal.

Figure 7:
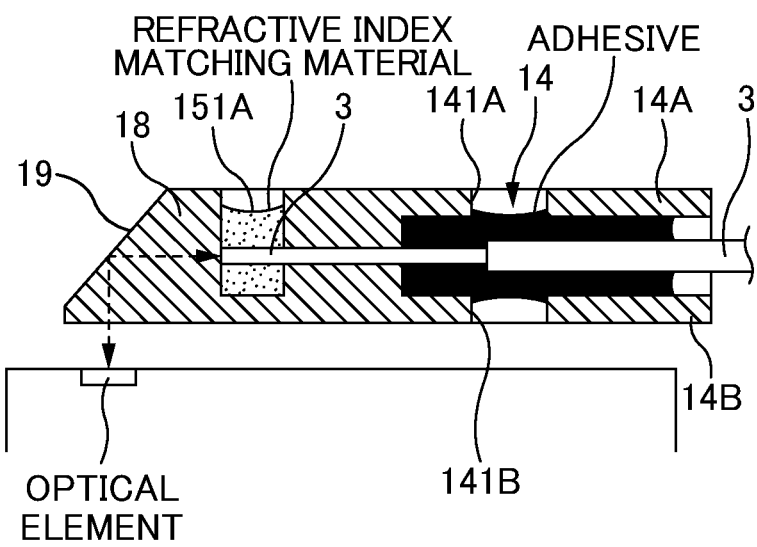
FIG. 7 is a schematic cross-sectional view of a ferrule 1 according to one or more embodiments.

FIG. 7 is a schematic cross-sectional view of the ferrule 1 according to one or more embodiments. Note that a portion having the same configuration is denoted by the same reference sign.

In one or more embodiments, an optical element is provided on a substrate or a photoelectric conversion module, and the ferrule 1 is fixed to the optical element with a holder (not illustrated) so as to face the optical element. Examples of the optical element include a light emitting element such as a semiconductor laser and a light receiving element such as a photodiode.

The ferrule 1 in one or more embodiments is molded by resin that allows transmission of an optical signal, similarly to the ferrule body 10 in one or more embodiments previously described. In one or more embodiments, a lower surface of the ferrule 1 is a ferrule endface, and an optical signal is input to and output from the lower surface of the ferrule 1. The reflecting part 19 is provided on a light transmission part 18. The reflecting part 19 is an inclination surface so as to get closer to a matching material filling part 15 from a lower surface side toward an upper surface side.

When an optical element is a light emitting element, the reflecting part 19 reflects light incident from the ferrule endface toward an endface of an optical fiber 3. When an optical element is a light receiving element, the reflecting part 19 reflects light emitted from the endface of the optical fiber 3 toward the optical element. In this way, the reflecting part 19 reflects an optical signal to convert an optical path.

Also in one or more embodiments, the ferrule 1 includes fiber holes 12, an adhesive filling part 14, upper openings 141A for filling an adhesive in the adhesive filling part 14, and lower openings 141B. Also in one or more embodiments, the adhesive filling from the upper openings 141A of the adhesive filling part 14 first permeates and is applied between an inner wall surface of an upper wall part 14A and the optical fibers 3. At this time, the lower openings 141B of the adhesive filling part 14 function as vent holes, and thus the adhesive is less likely to build up on the upper side of the plurality of optical fibers 3 and is more likely to reach the inner wall surface of the lower wall part 14B (the bottom surface of the adhesive filling part 14). In this way, the adhesive is sufficiently applied between the inner wall surface of the lower wall part 14B and the optical fibers 3. Thus, also in one or more embodiments, the adhesive can be sufficiently applied between the inner wall surfaces (particularly, the inner wall surfaces of the upper wall part 14A and the lower wall part 14B) of the adhesive filling part 14 and the optical fibers 3, and thus the optical fibers 3 can be fixed to the ferrule 1 with sufficient fastening force.

Figure 8A:
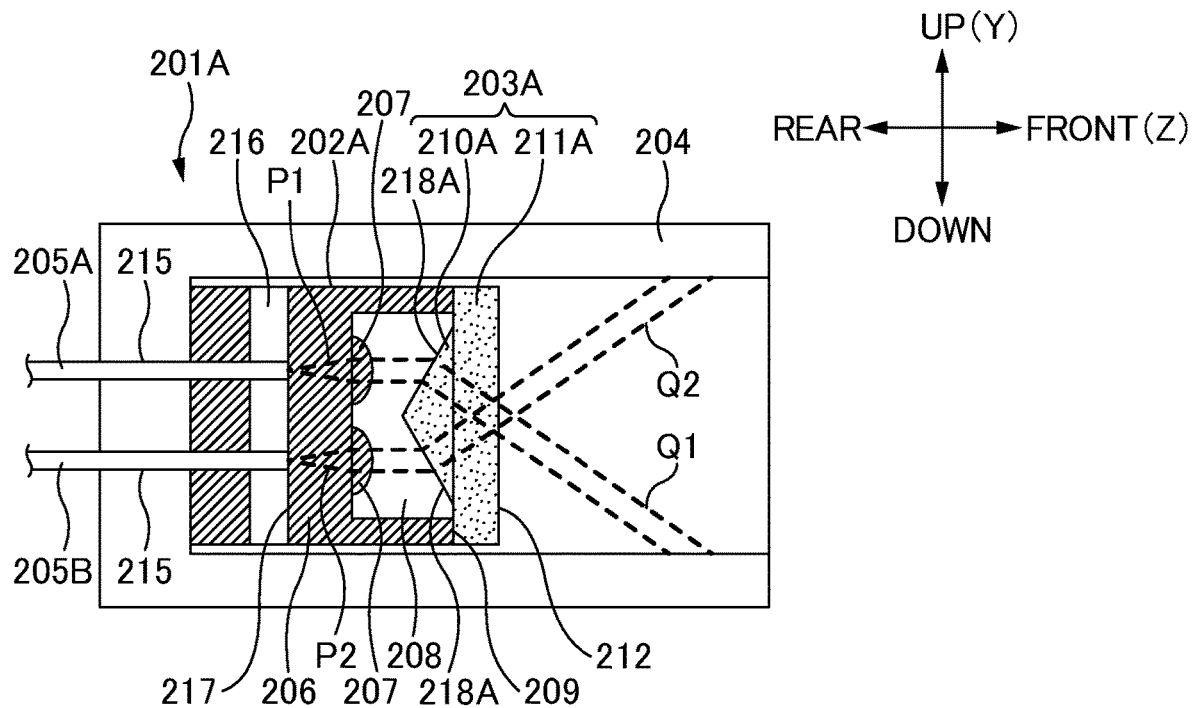
FIG. 8A is an explanatory schematic diagram of a ferrule 201 when a ferrule 201A according to one or more embodiments is not connected to a ferrule 201B.
Figure 8B:
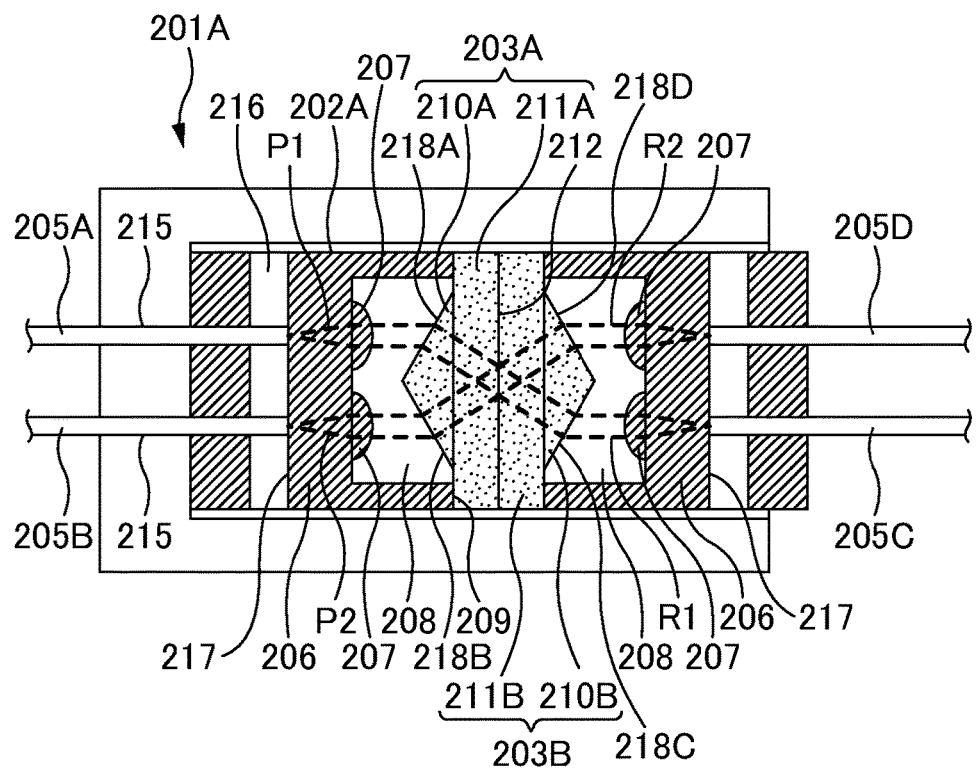
FIG. 8B is an explanatory schematic diagram of the ferrule 201 when the ferrule 201A according to one or more embodiments is connected to the ferrule 201B.
Figure 9A:
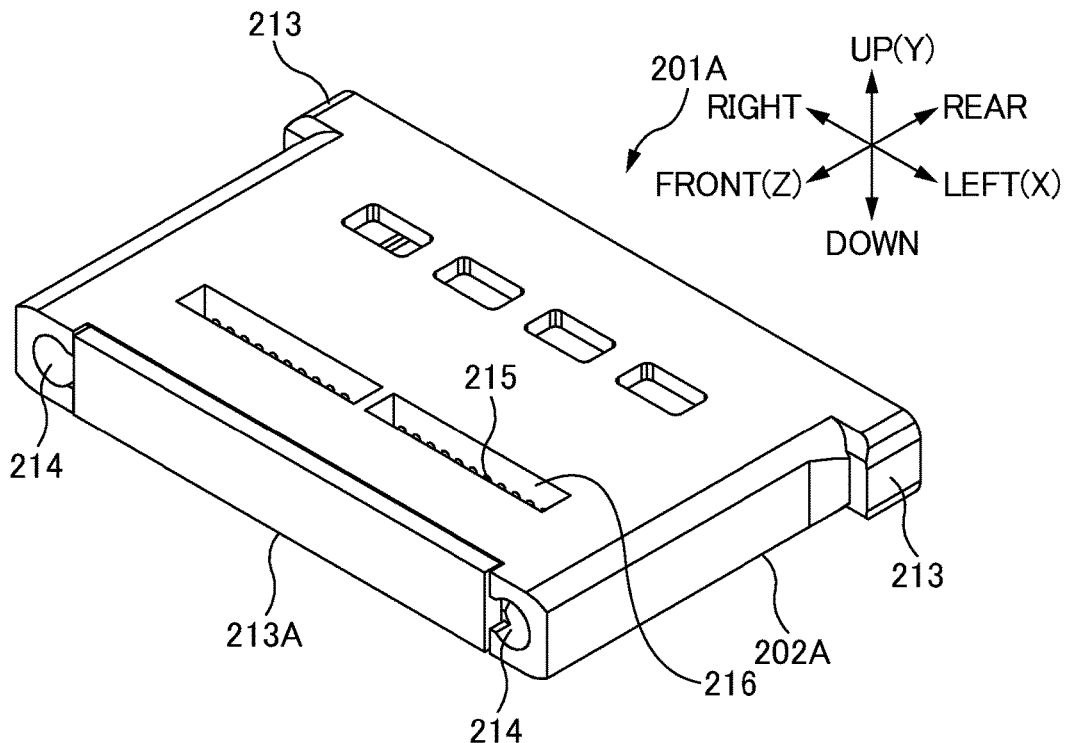
FIG. 9A is a perspective view of the ferrule 201A in a state where an optical path conversion module 203A is attached to a body part 202A.
Figure 9B:
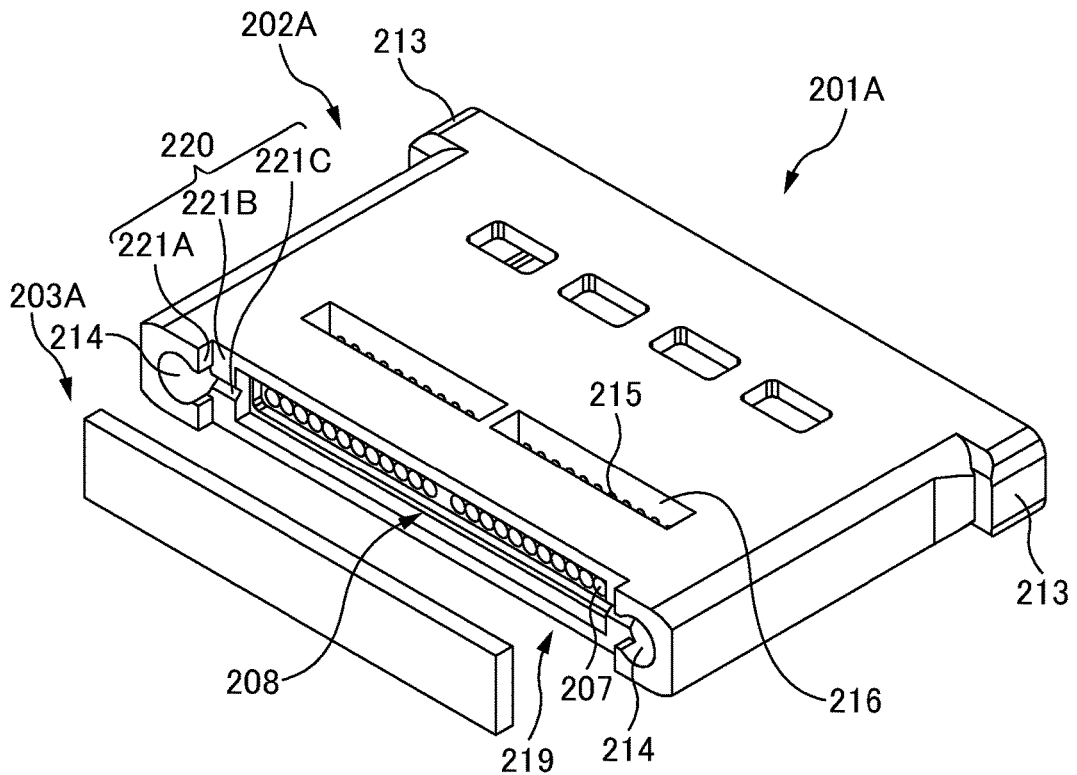
FIG. 9B is a perspective view of the ferrule 201A in a state where the optical path conversion module 203A is removed from the body part 202A.

FIG. 8A is an explanatory schematic diagram of a ferrule 201 when a ferrule 201A according to one or more embodiments is not connected to a ferrule 201B. FIG. 8B is an explanatory schematic diagram of the ferrule 201 when the ferrule 201A according to the third embodiment is connected to the ferrule 201B. FIG. 9A is a perspective view of the ferrule 201A in a state where an optical path conversion module 203A is attached to a body part 202A. FIG. 9B is a perspective view of the ferrule 201A in a state where the optical path conversion module 203A is removed from the body part 202A. First, a basic configuration of the ferrule 201A illustrated in FIGS. 8A to 9B is described, and the optical path conversion module 203A is then described.

In the following description, while a plug side and a receptacle side in a configuration of the ferrule 201 are distinguished from each other as, for example, the ferrule 201A and the ferrule 201B provided with an English letter, respectively, the plug side and the receptacle side may be referred to as, for example, the ferrule 201 without an English letter when they are not distinguished from each other and collectively called. The same also applies to a body part 202 and an optical path conversion module 203 described later.

In the following description, directions will be defined as illustrated in the drawings. Specifically, a direction in which the optical path conversion module 203A is attached to the body part 202A is a "front-rear direction", a side of a plate 211A is "front", and an opposite side is "rear". A front direction may also be referred to as a "Z direction". Further, a thickness direction of the ferrule 201A is an "up-down direction", an upper side when the rear is seen from the front is "up", and an opposite side is "down". An up direction may also be referred to as a "Y direction". Further, a direction perpendicular to the front-rear direction and the up-down direction is a "left-right direction". Note that a width direction of the ferrule 201A is the "left-right direction", and a direction in which two guide pin holes 214 are aligned is the "left-right direction" (cf. FIG. 9B). Further, a direction in which a plurality of optical fiber holes 215 are aligned is the "left-right direction" (cf. FIG. 9B). A right side when the front is seen from the rear is "right", and an opposite side is "left" in this left-right direction. A left direction may also be referred to as an "X direction".

Further, directions rotating about axes in the "X direction", the "Y direction", and the "Z direction" may be referred to as an "RX direction", an "RY direction", and an "RZ direction", respectively. Further, a surface defined by the axis in the X direction and the axis in the Y direction may be referred to as an "XY plane", a surface defined by the axis in the Y direction and the axis in the Z direction may be referred to as a "YZ plane", and a surface defined by the axis in the Z direction and the axis in the X direction may be referred to as a "ZX plane".

Basic Configuration of Ferrule 201

First, a difference between the ferrule 201 (the ferrule 201A and the ferrule 201B) in one or more embodiments and a normal MT ferrule (optical connector specified by JIS C5981) is described.

In the normal MT ferrule, an optical fiber end-face is exposed from a ferrule endface. Then, the ferrule endfaces abut each other and the optical fiber end-faces are physically connected to each other, and thus optical fibers are optically connected to each other.

In contrast, an optical fiber end-face is not exposed from a ferrule endface 209 in the ferrule 201 in one or more embodiments. In the ferrule 201 in one or more embodiments, a lens part 207 is arranged in a recess 208 of the ferrule endface 209, and an optical signal is input to and output from the lens part 207. In other words, optical fiber end-faces do not physically contact each other in the ferrule 201 in one or more embodiments. Thus, durability is high without deterioration even if attaching and detaching are repeated.

The ferrule 201 is a member to hold end parts of an optical fiber 205A to an optical fiber 205D when the optical fibers that transmit an optical signal are optically connected to each other. Note that the optical fiber 205A and the optical fiber 205B (FIG. 8A) may be collectively simply referred to as an "optical fiber 205". The optical fiber 205A to the optical fiber 205D (FIG. 8B) may also be collectively simply referred to as the "optical fiber 205". A basic configuration of the ferrule 201A on the plug side (side from which an optical signal is output) of the ferrule 201 (the ferrule 201A and the ferrule 201B) is described below. Note that a basic configuration of the ferrule 201B on the receptacle side (side to which an optical signal is input) is described later.

The ferrule 201A includes the body part 202A, the optical path conversion module 203A, and a housing 204.

The body part 202A is a member to hold the end part of the optical fiber 205 and also inputs and outputs an optical signal transmitted by the optical fiber 205. Note that the body part 202A corresponds to the above-described ferrule body 10. A front endface (ferrule endface 209) of the body part 202A is a surface on which the optical path conversion module 203A (corresponding to the above-described prism plate 20) is mounted. A flange part 213 protruding outward from an outer surface of the body part 202A is formed on the rear side of the body part 202A (cf. FIG. 9A). The body part 202A including the ferrule endface 209 and the flange part 213 are integrally molded by resin (for example, transparent resin) that allows transmission of an optical signal. The end parts of the plurality of optical fibers 205 are held inside this body part 202A.

The body part 202A includes the guide pin holes 214, the optical fiber holes 215, an adhesive filling part 216, the recess 208, the lens part 207, and a light transmission part 206.

Each of the guide pin holes 214 is a hole (guide hole) into which a guide pin (not illustrated) is to be inserted. The guide pin is inserted in the guide pin hole 214, and thus the ferrule 201A and the ferrule 201B are aligned with each other. The guide pin hole 214 penetrates the body part 202A in the front-rear direction. The two guide pin holes 214 are opened in the front endface of the body part 202A. The two guide pin holes 214 are formed at an interval in the left-right direction so as to sandwich the plurality of optical fiber holes 215 from the left and right. The recess 208, the lens part 207, and the light transmission part 206 are also arranged between the two guide pin holes 214 in addition to the optical fiber holes 215.

Each of the optical fiber holes 215 is a hole (fiber hole) into which the optical fiber 205 is to be inserted. The optical fiber hole 215 is also a hole for positioning the optical fiber 205. The optical fiber hole 215 penetrates a boot hole (not illustrated) provided in a rear part of the body part 202A and the adhesive filling part 216. A bare fiber in which a sheath is removed from a coated optical fiber is inserted in the optical fiber hole 215. Further, the plurality of optical fiber holes 215 are parallel to each other in the front-rear direction and aligned in the left-right direction. In other words, the plurality of optical fiber holes 215 parallel to each other are aligned in the left-right direction. Further, the plurality of optical fiber holes 215 aligned in parallel with each other are also aligned in the up-down direction (cf. FIG. 8). In other words, columns of the plurality of optical fiber holes 215 aligned in parallel with each other in the left-right direction are also aligned in parallel with each other in the up-down direction.

The adhesive filling part 216 is a hollow part to be filled with an adhesive. Note that the adhesive filling part 216 corresponds to the above-described matching material filling part 15. The adhesive filling part 216 is a hollow long in the left-right direction (having a length longer than a length at which the plurality of optical fiber holes 215 and the lens part 207 are aligned in the left-right direction). A front inner wall of the adhesive filling part 216 is an abutment surface 217 that receives abutment of the endface of the optical fiber 205.

The recess 208 is a portion being recessed with respect to the ferrule endface 209. The recess 208 is provided between the two guide pin holes 214 in the ferrule endface 209. The recess 208 has a long narrow rectangular shape in the left-right direction so as to correspond to the plurality of optical fiber holes 215.

The lens part 207 is provided on a bottom surface (rear side surface) of the recess 208. The lens part 207 is arranged so as to correspond to each of the plurality of optical fibers 205 (in other words, the plurality of optical fiber holes 215), and an optical signal is input and output via the lens part 207. The lens part 207 is formed so as to function as, for example, a collimating lens. A coupling loss due to slight misalignment of axes of optical fibers to be connected can be reduced by outputting an optical signal having a diameter magnified by the lens part 207. An influence of dust and the like in an optical path can be reduced, and a transmission loss of an optical signal can be suppressed.

The light transmission part 206 is a portion (portion in which an optical path is formed) that allows an optical signal to be transmitted between the lens part 207 and the abutment surface 217 of the adhesive filling part 216. Note that the body part 202A in one or more embodiments is integrally molded by transparent resin that allows transmission of an optical signal, but at least a portion (light transmission part 206) in which an optical path is formed may allow transmission of an optical signal, and a portion other than this may be constituted by a different material (material that does not allow transmission of an optical signal).

Optical Path Conversion Module 203

Next, the optical path conversion module 203A is described with reference to FIGS. 8A and 8B. The optical path conversion module 203A is a member that is mounted on the ferrule endface 209 of the body part 202A and converts an optical path of an optical signal input and output via the lens part 207. The optical path conversion module 203A is also a member including a function as an optical shutter. Specifically, by converting an optical path, the optical path conversion module 203A causes an optical signal not to be emitted to the outside during non-connection between the ferrule 201A and the ferrule 201B (closed optical shutter), and causes an optical signal to be transmitted from the ferrule 201A to the ferrule 201B during connection between the ferrule 201A and the ferrule 201B (open optical shutter). The optical path conversion module 203A in one or more embodiments converts an optical path by converting a direction in which an optical signal travels by using refraction of light.

The optical path conversion module 203A includes a prism 210A and a plate 211A.

The prism 210A is a portion that converts an optical path of an optical signal input and output via the lens part 207 in the optical path conversion module 203A. Note that the prism 210 corresponds to the above-described prism part 21. As illustrated in FIGS. 8A and 8B, an optical path P1 and an optical path P2 of optical signals respectively transmitted by the optical fiber 205A and the optical fiber 205B and collimated via the lens part 207 are each an optical path parallel to the Z direction. In a case where the ferrule 201A without the optical path conversion module 203A being attached thereon is connected to the ferrule 201B without an optical path conversion module 203B being attached thereon, the optical path P1 and the optical path P2 are provided so as to be input to the optical fiber 205D and the optical fiber 205C, respectively, via the lens part 207 again. In other words, optical axes of P1 and P2 are provided so as to be input to the optical fiber 205D and the optical fiber 205C, respectively. In one or more embodiments, the optical paths are converted such that the optical path P1 and the optical path P2 are converted to an optical path Q1 and an optical path Q2, respectively, by passing through the optical path conversion module 203A.

The plate 211A is a portion to hold the prism 210A and allows the optical path conversion module 203A to be mounted on the body part 202A. The prism 210A is provided on a rear endface of the plate 211A. The optical path conversion module 203 is mounted on the body part 202 such that a prism surface 218A and a prism surface 218B of the prism 210A face toward the rear. In other words, the optical path conversion module 203 is mounted on the body part 202 in a direction in which the prism surface 218A and the prism surface 218B face the lens part 207. Further, a plate endface 212 being the front endface of the plate 211 is a surface parallel to the XY plane. Note that the plate 211A and the prism 210A may be molded as separate members and assembled, or may be integrally molded by resin.

During Non-Connection Between Ferrule 201A and Ferrule 201B

In FIG. 8A, a surface (the prism surfaces 218A and 218B) on which an optical signal is incident with respect to the prism 210A is a surface parallel to a surface inclined from the XY plane to the RX direction by a predetermined angle. Each surface through which an optical signal is incident from or to the prism 210A or a prism 210B may be referred to as a light incidence/emission surface below. Specifically, the prism surface 218A is a surface parallel to a plane inclined from the XY plane to the +RX direction by a predetermined angle θ. Further, the prism surface 218B is a surface parallel to a plane inclined from the XY plane to the −RX direction by the predetermined angle θ. The optical path P1 passes through the prism 210A to be converted to the optical path Q1 refracted from a direction parallel to the Z direction to a lower side (−Y direction). The optical path P2 passes through the prism 210A to be converted to the optical path Q2 refracted from a direction parallel to the Z direction to an upper side (+Y direction). The optical paths Q1 and Q2 obtained by converting the respective optical paths are blocked by inner walls of the housing 204 of the ferrule 201A. In this way, an exit of an optical signal that has passed through the optical path conversion module 203A to the outside of the housing 204 of the ferrule 201A is suppressed. In other words, an exit of an optical signal to the outside of the housing 204 of the ferrule 201A is suppressed in the ferrule 201A during non-connection with the ferrule 201B.

During Connection Between Ferrule 201A and Ferrule 201B

The ferrule 201B illustrated in FIG. 8B includes a body part 202B and the optical path conversion module 203B (the prism 210B and a plate 211B). The ferrule 201B has the same configuration as that of the ferrule 201A except for the housing 204. When the ferrule 201A is connected to the ferrule 201B, the ferrule 201A and the ferrule 201B are connected to each other such that plate endfaces 212 of the ferrule 201A and the ferrule 201B face each other. At this time, the plate endfaces 212 may contact each other, or may not contact each other.

When the ferrule 201A and the ferrule 201B are connected to each other such that the plate endfaces 212 face each other in such a manner, the body part 202B and the optical path conversion module 203B of the ferrule 201B are arranged to be inverted in the Z direction with respect to the body part 202A and the optical path conversion module 203A of the ferrule 201A. Further, the prism 210B and the plate 211B of the optical path conversion module 203B have the same shape as that of the prism 210A and the plate 211A of the optical path conversion module 203A. Thus, the optical paths Q1 and Q2 obtained by converting the optical paths by the optical path conversion module 203A pass through the prism 210B to be converted to the direction parallel to the Z direction again (optical paths R1 and R2). The optical signal passing through the optical path R1 is transmitted to the optical fiber 205C via the lens part 207 of the body part 202B. Further, the optical signal passing through the optical path R2 is transmitted to the optical fiber 205D via the lens part 207 of the body part 202B. In other words, the optical signals cross each other and are transmitted from the optical fiber 205A and the optical fiber 205B to the optical fiber 205C and the optical fiber 205D, respectively, during connection between the ferrule 201A and the ferrule 201B illustrated in FIG. 8B.

Positioning

In one or more embodiments, optical connection is performed via the optical path conversion module 203 attached to the body part 202, and thus positioning with a high degree of precision is needed for attaching the optical path conversion module 203 to the body part 202. When this position is misaligned, optical signals may not be properly transmitted from the optical fiber 205A and the optical fiber 205B to the optical fiber 205C and the optical fiber 205D, respectively, and a transmission loss may be caused.

Positioning in one or more embodiments is performed by defining six axes in which the optical path conversion module 203 is movable with respect to the body part 202 and fixing (restraining) all movement or rotation related to the six axes. Here, the six axes represent an X-axis direction, a Y-axis direction, and a Z-axis direction being movement directions and the RX direction, the RY direction, and the RZ direction being rotation directions. Therefore, the body part 202 and the optical path conversion module are positioned by fixing the above-mentioned six axes.

Figure 10:
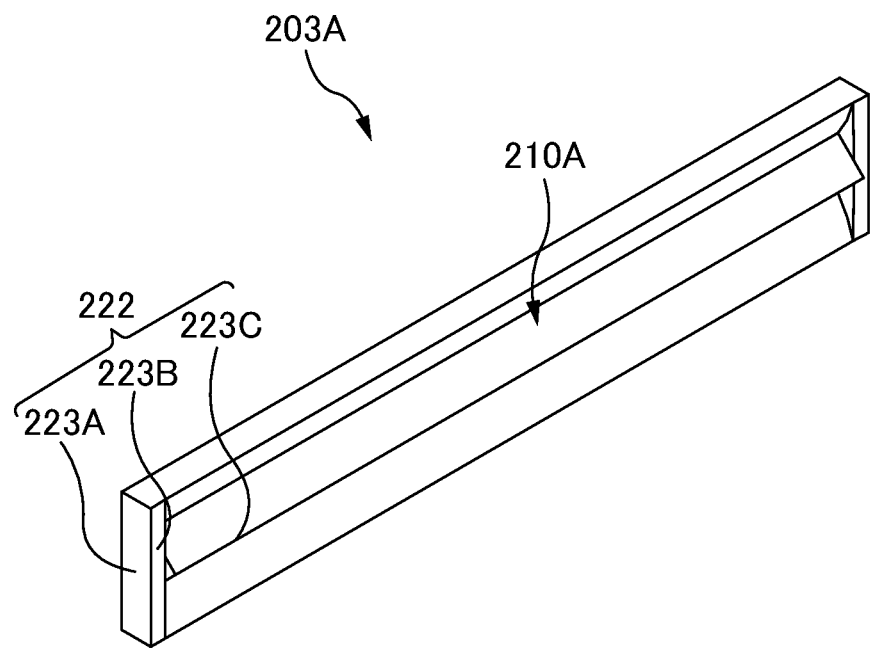
FIG. 10 is a perspective view of the optical path conversion module 203A according to one or more embodiments when seen from a rear side.
Figure 11:
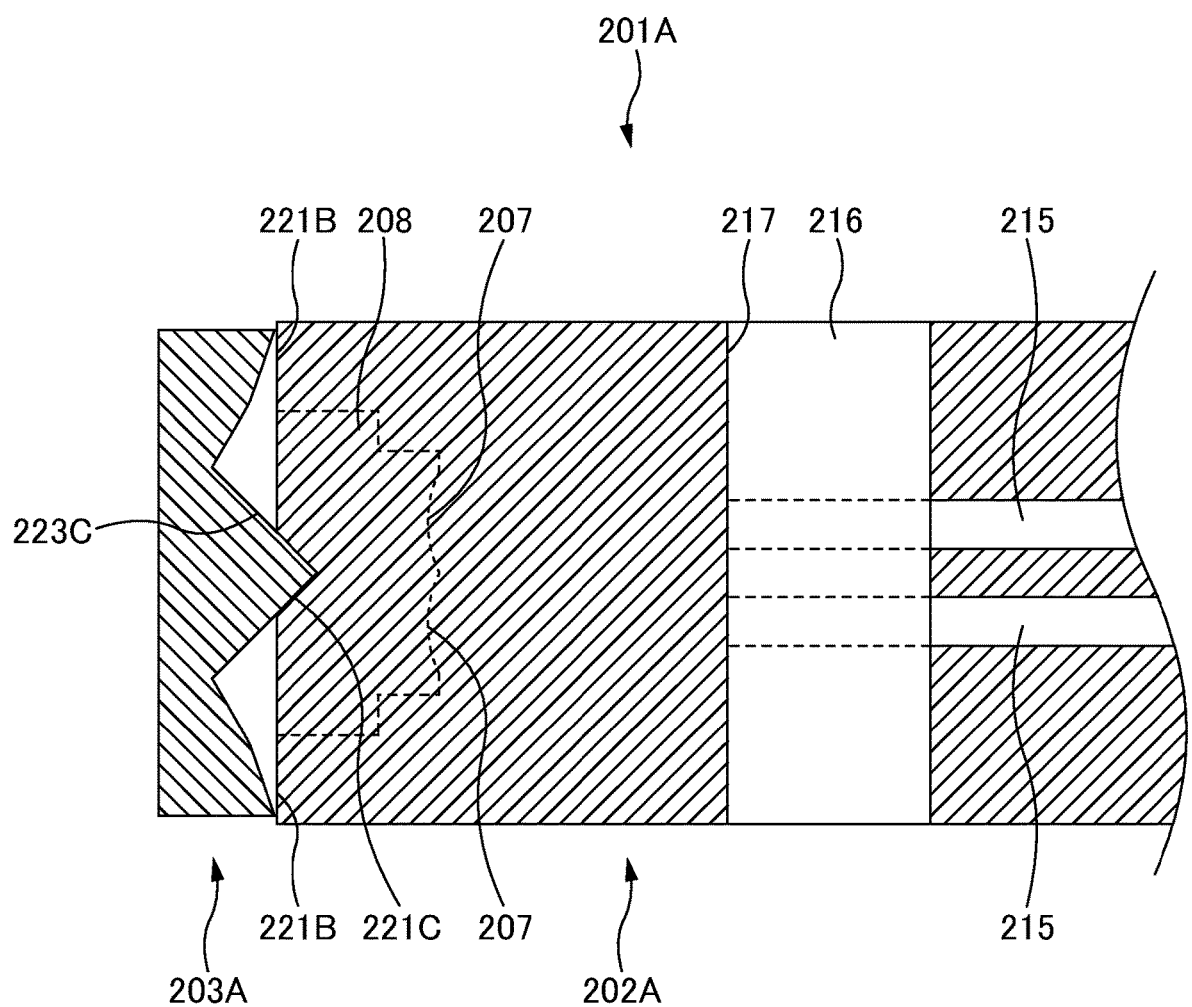
FIG. 11 is an enlarged cross-sectional view of an attaching part of the ferrule 201A in the state where the optical path conversion module 203A is attached to the body part 202A.

FIG. 10 is a perspective view of the optical path conversion module 203A according to one or more embodiments when seen from the rear side. FIG. 11 is an enlarged cross-sectional view of an attaching part of the ferrule 201A in the state where the optical path conversion module 203A is attached to the body part 202A.

The ferrule 201A illustrated in FIGS. 9A to 11 is positioned by fitting the optical path conversion module 203A in a front part of the body part 202A. Note that positioning related to the ferrule 201A is described below, and the same also applies to the ferrule 201B (the body part 202B and the optical path conversion module 203B).

The body part 202A includes, on the front side thereof, a housing part 219 that is fitted to and houses the optical path conversion module 203A. A body-side positioning part 220 is provided in this housing part 219. The body-side positioning part 220 includes body-side fitting surfaces 221A, a body-side fitting surface 221B, and V-shaped grooves 221C.

The body-side fitting surfaces 221A and the body-side fitting surface 221B are provided on inner surfaces of the housing part 219. Each of the body-side fitting surfaces 221A is a surface parallel to the YZ plane, and the body-side fitting surfaces 221A in a left-and-right pair are provided on left-right inner surfaces of the housing part 219. The body-side fitting surface 221B is a surface parallel to the XY plane and is provided on a front inner surface of the housing part 219. A central part of the body-side fitting surface 221B is a recess 208. In other words, the body-side fitting surface 221B is provided along an outer edge of the recess 208.

The V-shaped grooves 221C in a left-and-right pair are provided on the body-side fitting surface 221B so as to extend in the left-right direction. Each of the V-shaped groove 221C illustrated in FIG. 9B extends from the recess 208 to the guide pin hole 214. Note that a portion contacting prism-side fitting surfaces 223B described later may not be provided with the V-shaped grooves 221C. The V-shaped grooves 221C are molded according to a shape of a prism protrusion 223C so as to be fitted to the prism protrusion 223C described later.

The optical path conversion module 203A is fitted so as to be housed between the two guide pin holes 214 of the body part 202A. Therefore, a guide pin hole is not formed in the optical path conversion module 203A. However, a guide pin hole may be formed, and the optical path conversion module 203A may be fitted to the body part 202A so as to cover the entire front endface of the body part 202A.

The optical path conversion module 203A includes a prism-side positioning part 222 for a fit in the body part 202A. The prism-side positioning part 222 includes prism-side fitting surfaces 223A, the prism-side fitting surface 223B, and the prism protrusion 223C.

Each of the prism-side fitting surfaces 223A is a surface parallel to the YZ plane, and the prism-side fitting surfaces 223A in a pair are provided on the left-right endfaces of the optical path conversion module 203A. A length between the left-and-right pair of the prism-side fitting surfaces 223A, namely, a length in the left-right direction of the optical path conversion module 203A is slightly smaller than a length between the pair of the body-side fitting surfaces 221A of the body part 202A. In this way, the optical path conversion module 203A is housed to such an extent that the optical path conversion module 203A can be roughly positioned with respect to the housing part 219 of the body part 202A. Therefore, the prism-side fitting surfaces 223A contact the body-side fitting surfaces 221A, and thus rough positioning in the X direction and the RZ direction is performed.

Each of the prism-side fitting surfaces 223B is a surface parallel to the XY plane, and the prism-side fitting surfaces 223B in a left-and-right pair are provided on a rear endface of the optical path conversion module 203A. The prism-side fitting surfaces 223B contact the body-side fitting surface 221B, and thus positioning in the Z direction and the RY direction is performed.

The prism protrusion 223C is a portion constituted by the prism surfaces 218A and 218B of the prism 210A of the optical path conversion module 203A. In one or more embodiments, the prism 210A is formed to be longer than the recess 208 in the left-right direction, and thus a portion arranged outside in the left-right direction with respect to the recess 208 is the prism protrusion 223C, and constitutes the prism-side positioning part 222 for a fit in the body part 202A. The prism protrusion 223C is fitted in the V-shaped grooves 221C of the body part 202A similarly extending in the left-right direction, and thus positioning in the Y direction, the RY direction, and the RZ direction is performed.

In this way, the body-side positioning part 220 and the prism-side positioning part 222 fix a total of the six axes of the X-axis direction, the Y-axis direction, and the Z-axis direction being movement directions and the RX direction, the RY direction, and the RZ direction being rotation directions, and positioning with a high degree of precision is performed when the optical path conversion module 203 is attached to the body part 202. It should be noted that positioning in the X direction is not strict, and only rough positioning is performed. However, the prism surface 218A and the prism surface 218B of the prism 210A are both formed to be surfaces parallel to the X direction, and a refraction angle on the prism surface 218A and the prism surface 218B hardly changes even in a case where slight misalignment occurs in the X direction. Therefore, even when rough positioning in the X direction is performed instead of strict positioning, an optical signal is almost properly transmitted, and an influence causing a transmission loss is small.

For positioning of the body part 202A and the optical path conversion module 203A in one or more embodiments, a characteristic is that the prism protrusion 223C of the prism-side positioning part 222 is formed by the prism surface 218A and the prism surface 218B of the prism 210A. In other words, a position is adjusted by the prism 210A itself, and the prism 210A is directly positioned. In this way, when the optical path conversion module 203A is attached to the body part 202A, positioning can be easily performed without a need for a jig and the like.

Attachment of Optical Path Conversion Module 203A to Ferrule Body Part 202A

Next, a procedure of attaching the optical path conversion module 203A to the body part 202A is described. First, the optical path conversion module 203A is positioned in such a way that the optical path conversion module 203A is pressed against the body part 202A. Next, an adhesive is injected into an adhering part of the body part 202A and the optical path conversion module 203A. A thermosetting adhesive is used as the adhesive. Here, in one or more embodiments, positioning with respect to the body-side positioning part 220 is performed by the prism 210A itself. For this reason, the adhering part may include an optical path, but the adhesive is not applied to a place at which an optical path is located. Lastly, heat is applied to cure the adhesive. In this way, attachment of the optical path conversion module 203A to the ferrule body part 202A is completed. Insertion of optical fibers into the optical fiber holes 215 is performed after attachment of the optical path conversion module 203A to the ferrule body part 202A is completed.

Figure 12A:
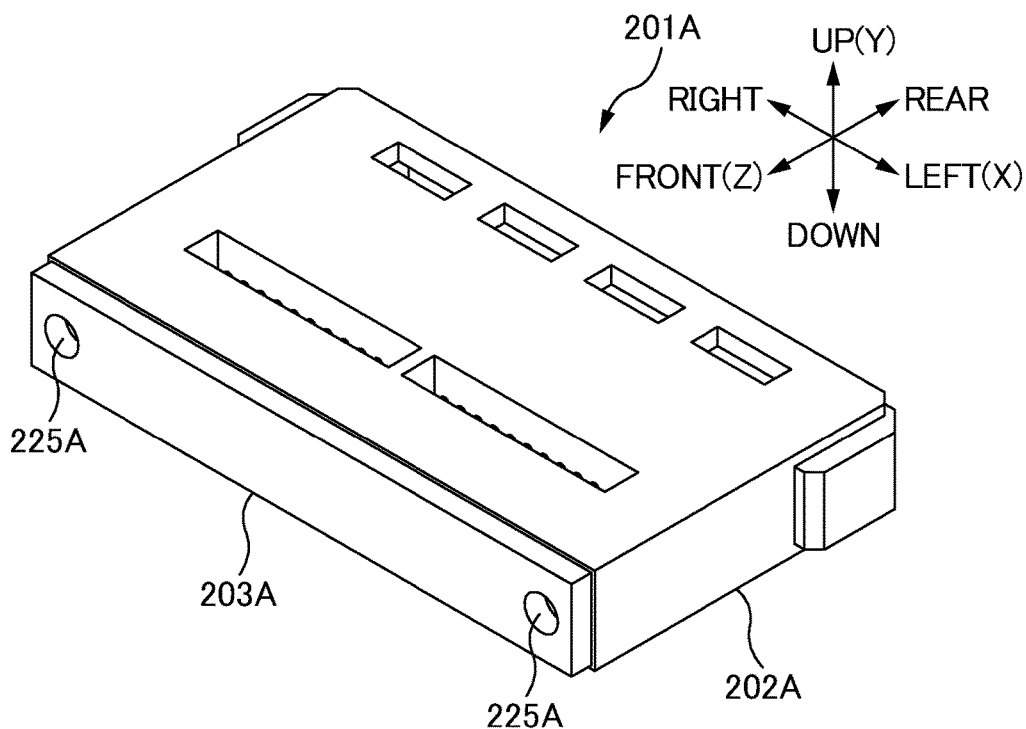
FIG. 12A is a perspective view of a ferrule 201A in a state where an optical path conversion module 203A is attached to a body part 202A.
Figure 12B:
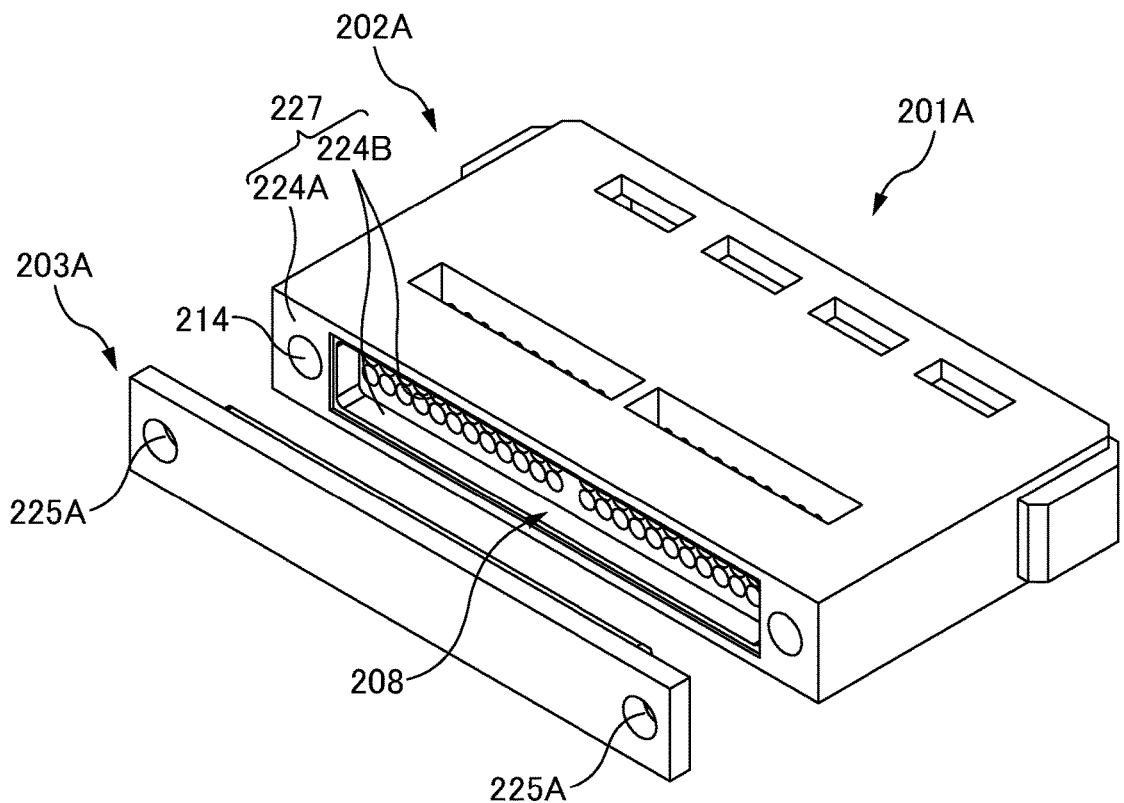
FIG. 12B is a perspective view of the ferrule 201A in a state where the optical path conversion module 203A is removed from the body part 202A.
Figure 13:
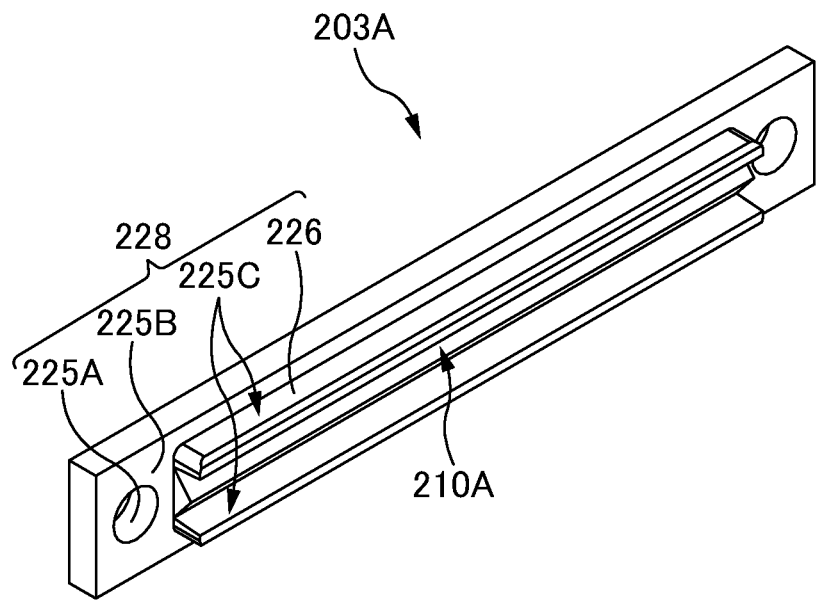
FIG. 13 is a perspective view of the optical path conversion module 203A according to one or more embodiments when seen from a rear side.
Figure 14:
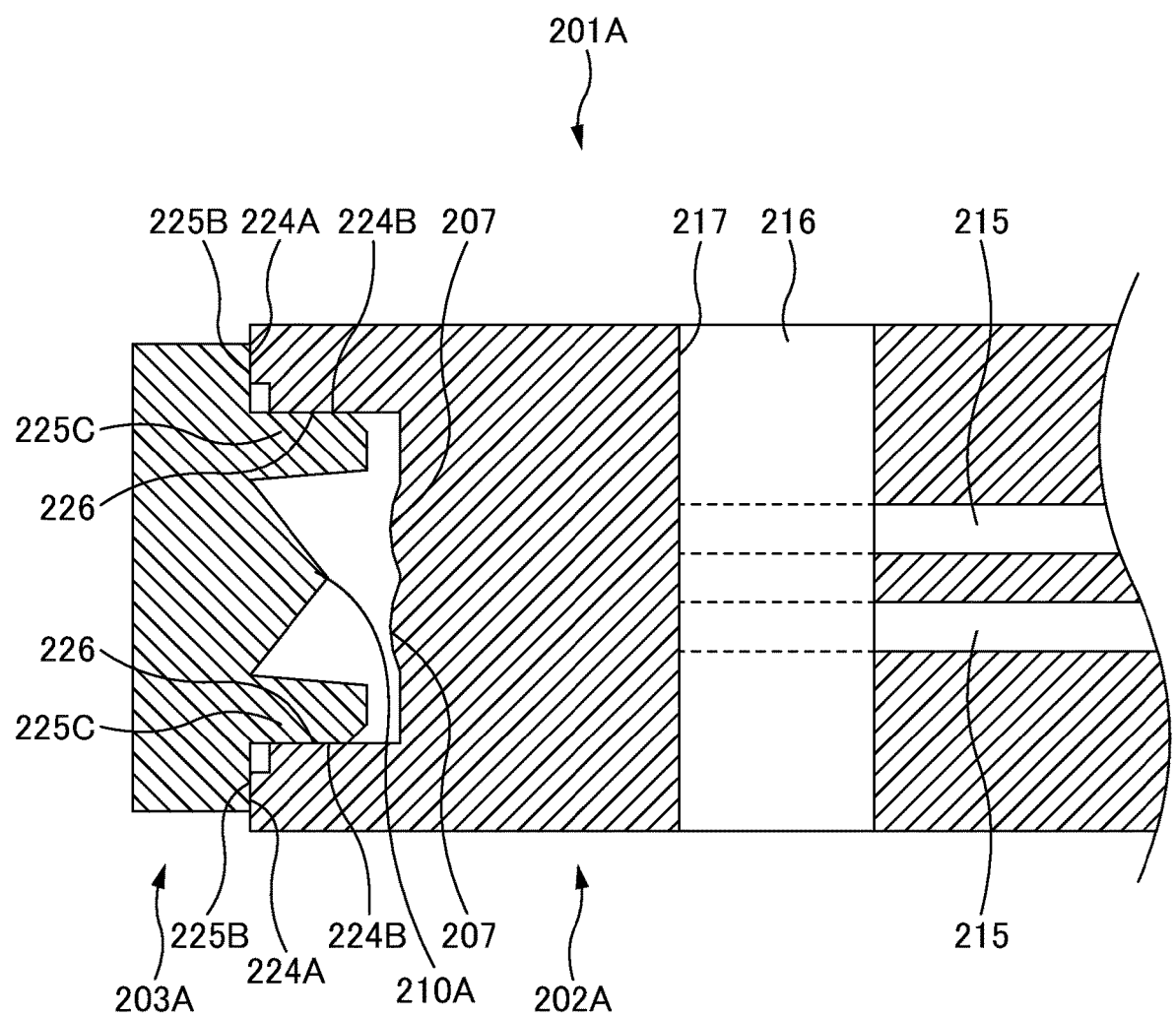
FIG. 14 is an enlarged cross-sectional view of an attaching part of the ferrule 201A in the state where the optical path conversion module 203A is attached to the body part 202A.

FIG. 12A is a perspective view of a ferrule 201A in a state where an optical path conversion module 203A is attached to a body part 202A. FIG. 12B is a perspective view of the ferrule 201A in a state where the optical path conversion module 203A is removed from the body part 202A. FIG. 13 is a perspective view of the optical path conversion module 203A according to one or more embodiments when seen from the rear side. FIG. 14 is an enlarged cross-sectional view of an attaching part of the ferrule 201A in the state where the optical path conversion module 203A is attached to the body part 202A.

The ferrule 201A illustrated in FIGS. 12A to 14 is positioned by fitting ribs 225C of the optical path conversion module 203A in an inner surface of a recess 208 of the body part 202A. Further, positioning is also performed by bringing the optical path conversion module 203A into contact with a front endface of the body part 202A.

A body-side positioning part 227 is provided on a front side of the body part 202A. The body-side positioning part 227 includes a body-side contact surface 224A and a body-side fitting surface 224B.

The body-side contact surface 224A is a surface parallel to the XY plane, and is a portion that contacts a prism-side contact surface 225B of the optical path conversion module 203A described later. The body-side contact surface 224A is formed on the front endface of the body part 202. Guide pin holes 214 in a pair are each provided on the left and the right of the body-side contact surface 224A. Further, the recess 208 is provided in a central part of the body-side contact surface 224A. In other words, the body-side contact surface 224A is provided along an outer edge of the recess 208.

The body-side fitting surfaces 224B are provided on an inner surface of the recess 208. Each of the body-side fitting surface 224B is a surface parallel to the XZ plane, and the body-side fitting surfaces 224B in an up-and-down pair are provided on the inner surface of the recess 208.

The optical path conversion module 203A is attached so as to cover the front endface of the body part 202A including the two guide pin holes 214. Therefore, prism-side guide pin holes 225A described later are provided in the optical path conversion module 203A so as to communicate with the guide pin holes 214. However, similarly to one or more embodiments previously discussed, a housing part that is fitted to and houses the optical path conversion module 203A may be formed, and the optical path conversion module 203A may be fitted so as to be housed between the two guide pin holes 214 of the body part 202A. In this case, the prism-side guide pin holes 225A may not be formed. Note that antireflection coating (AR coating) may be applied to the optical path conversion module 203A.

The optical path conversion module 203A includes a prism-side positioning part 228 for a fit to the body part 202A. The prism-side positioning part 228 includes the prism-side guide pin holes 225A, the prism-side contact surface 225B, and the ribs 225C.

The prism-side guide pin holes 225A in a pair are each provided on the left and the right of the optical path conversion module 203A. The prism-side guide pin holes 225A are provided so as to communicate with the guide pin holes 214 of the body part 202A. Guide pins (not illustrated) are inserted in the prism-side guide pin holes 225A together with the guide pin holes 214, and thus the ferrules 201 (1A and 1B) are aligned with each other. Further, guide pins (not illustrated) are inserted in the prism-side guide pin holes 225A together with the guide pin holes 214, and thus the optical path conversion module 203A is positioned with respect to the body part 202A in the X direction and the RZ direction.

The prism-side contact surface 225B is provided on a rear endface of the optical path conversion module 203A. The prism-side contact surface 225B is a surface parallel to the XY plane, and contacts the body-side contact surface 224A to be fixed in the Z direction. Therefore, the prism-side contact surface 225B contacts the body-side contact surface 224A, and thus the optical path conversion module 203A is positioned with respect to the body part 202A in the Z direction.

The ribs 225C are provided in a pair on both sides (top and bottom) of the prism 210A of the optical path conversion module 203A. The ribs 225C include a pair of rib fitting surfaces 226 on upper and lower surfaces on sides that do not face the prism 210A. Each of the rib fitting surfaces 226 is a surface parallel to the XZ plane, and contacts the body-side fitting surface 224B. A length between the pair of the rib fitting surfaces 226 is slightly shorter than a length between the pair of the body-side fitting surfaces 224B. These rib fitting surfaces 226 contact the body-side fitting surfaces 224B, and thus the ribs 225C are fitted in the recess 208. Note that these ribs 225C are fitted in the recess 208 by performing press fitting. The ribs 225C are fitted in the recess 208, and thus the optical path conversion module 203A is positioned with respect to the body part 202A in the Y direction, the RX direction, and the RY direction.

In this way, the body-side positioning part 227 and the prism-side positioning part 228 fix a total of the six axes of the X-axis direction, the Y-axis direction, and the Z-axis direction being movement directions and the RX direction, the RY direction, and the RZ direction being rotation directions, and positioning with a high degree of precision is performed when the optical path conversion module 203A is attached to the body part 202A.

In one or more embodiments, the ribs 225C provided in a pair on the both sides of the prism 210A are positioning members, and are also members that reinforce strength of the optical path conversion module 203A. In other words, as illustrated in FIG. 13, the ribs 225C are formed to protrude in the front-rear direction with respect to the plate 211A of the optical path conversion module 203A, and thus have a role in reinforcing the optical path conversion module 203A to withstand bending stress applied in the left-right direction, for example. Note that, when antireflection coating (AR coating) is applied to the optical path conversion module 203A by vapor deposition, a protruding height of the ribs 225C may be reduced to low in order to suppress shadows of the ribs 225C. However, the ribs 225C need a sufficient protruding height in order to maintain the above-mentioned strength.

Figure 15A:
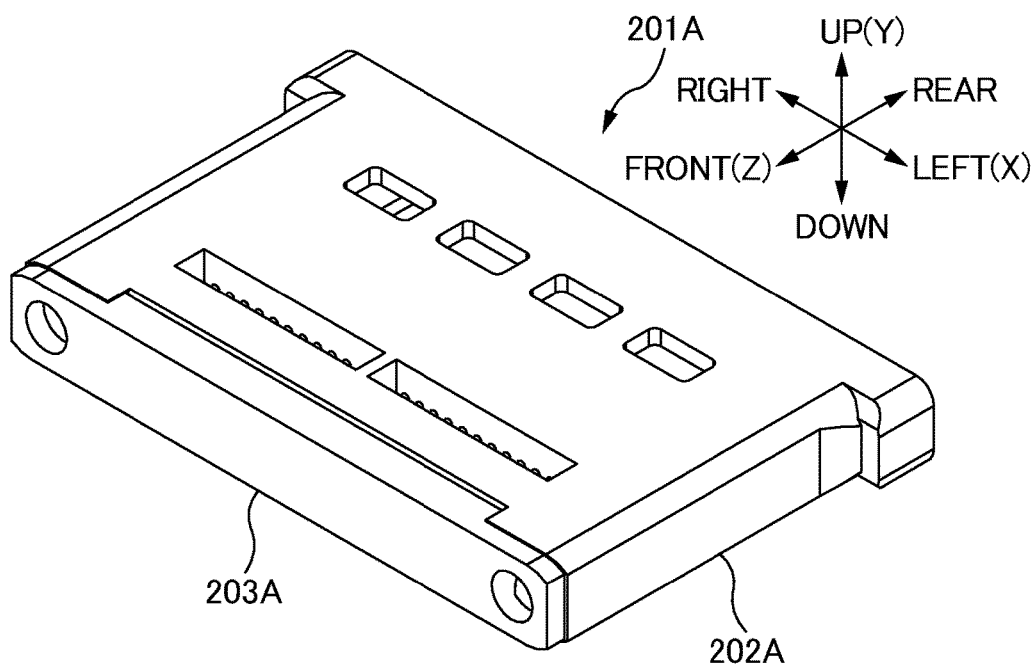
FIG. 15A is a perspective view of a ferrule 201A in a state where an optical path conversion module 203A is attached to a body part 202A.
Figure 15B:
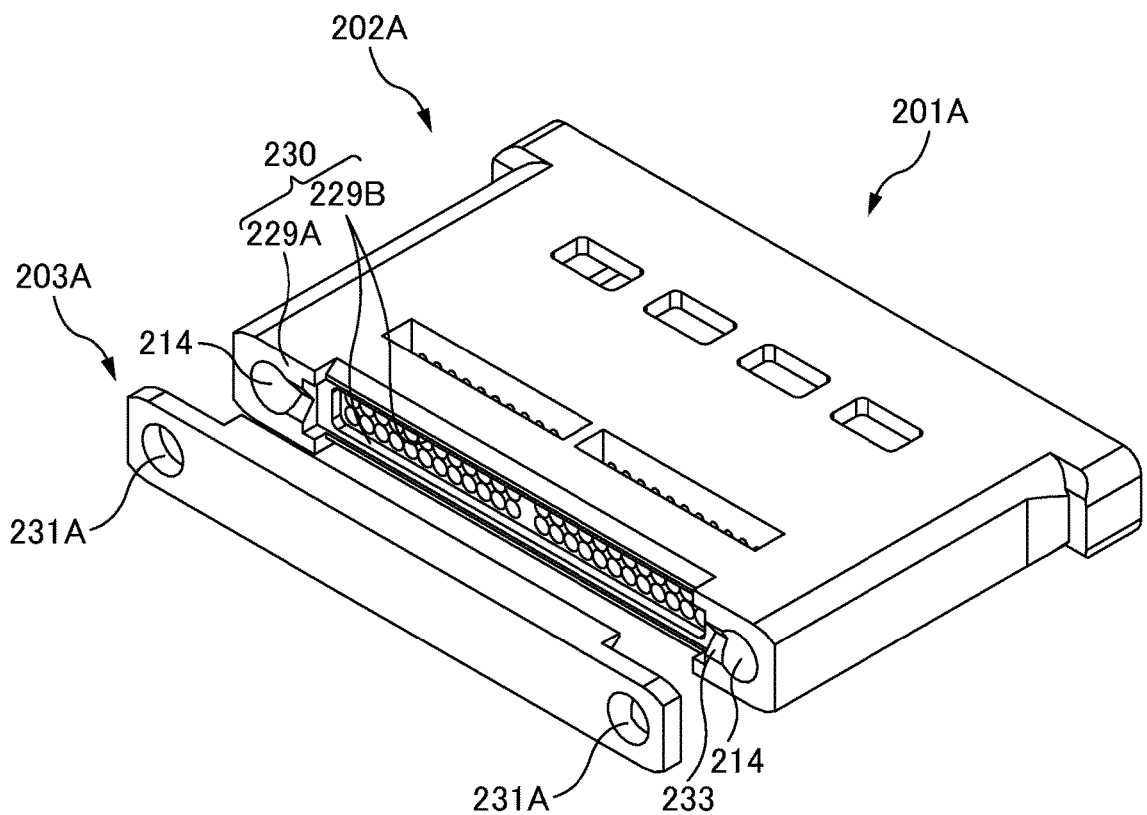
FIG. 15B is a perspective view of the ferrule 201A in a state where the optical path conversion module 203A is removed from the body part 202A.
Figure 16:
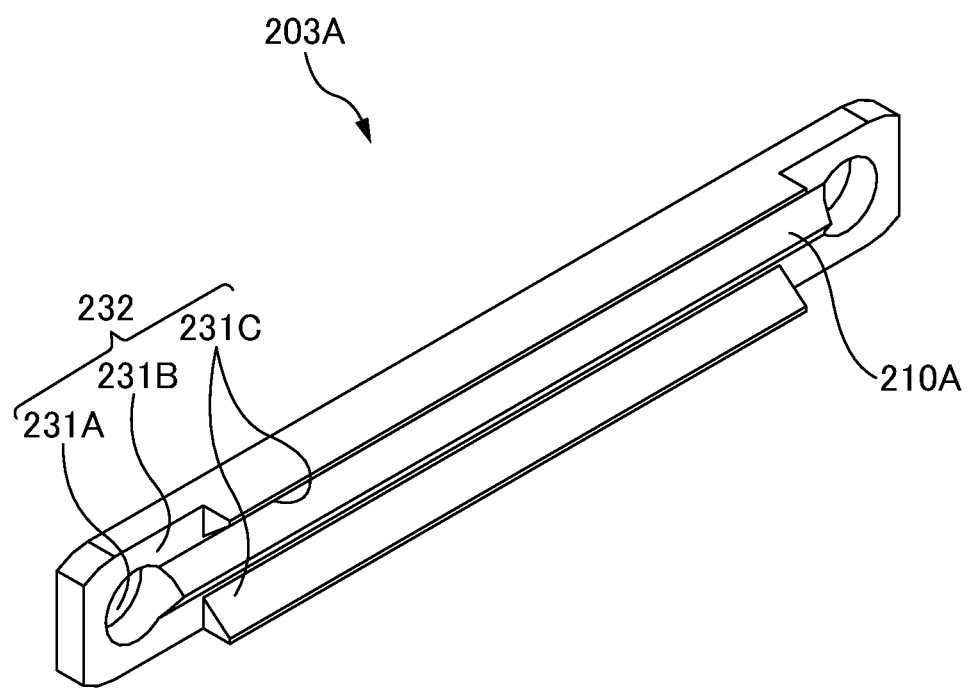
FIG. 16 is a perspective view of the optical path conversion module 203A according to one or more embodiments when seen from a rear side.
Figure 17:
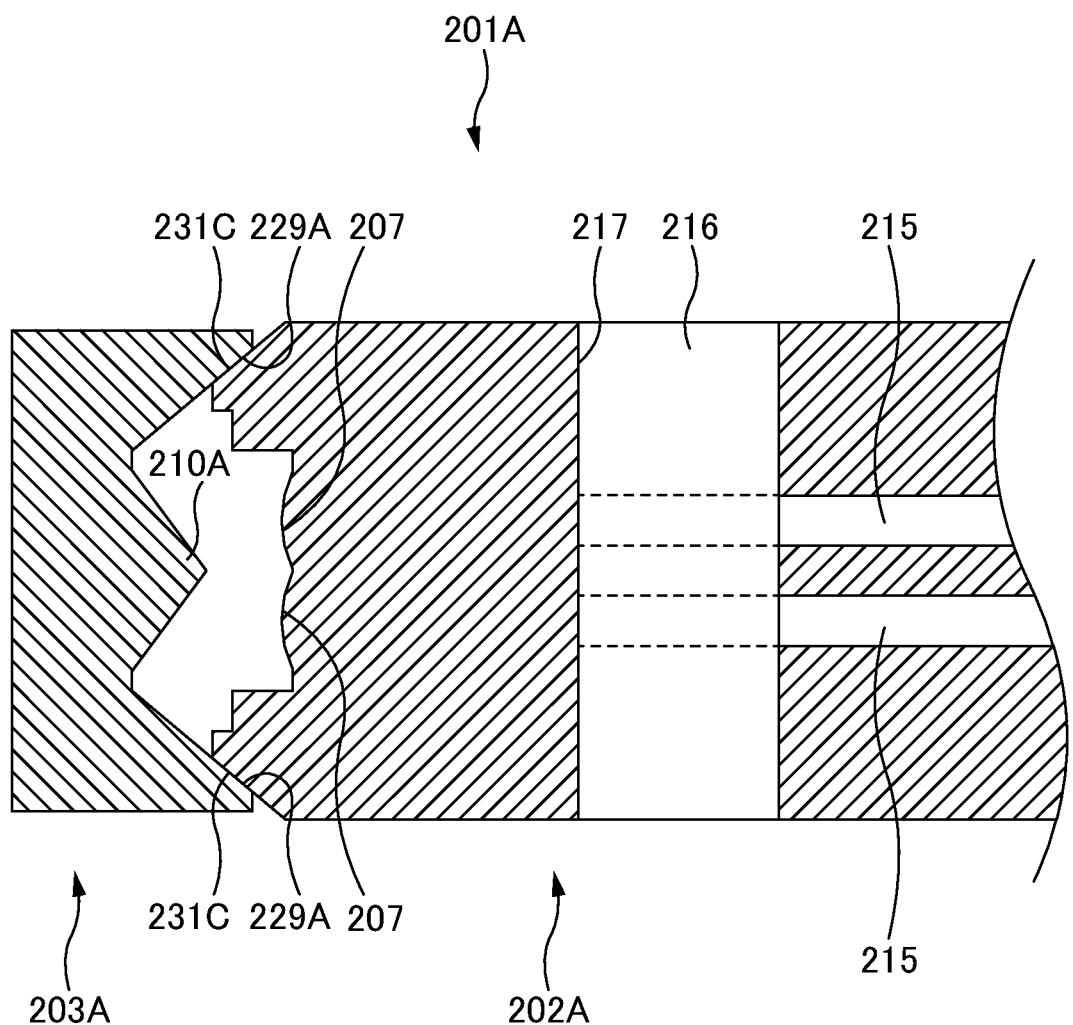
FIG. 17 is an enlarged cross-sectional view of an attaching part of the ferrule 201A in a state where the optical path conversion module 203A is attached to the body part 202A.

FIG. 15A is a perspective view of a ferrule 201A in a state where an optical path conversion module 203A is attached to a body part 202A. FIG. 15B is a perspective view of the ferrule 201A in a state where the optical path conversion module 203A is removed from the body part 202A. FIG. 16 is a perspective view of the optical path conversion module 203A according to one or more embodiments when seen from the rear side. FIG. 17 is an enlarged cross-sectional view of an attaching part of the ferrule 201A in the state where the optical path conversion module 203A is attached to the body part 202A.

The ferrule 201A illustrated in FIGS. 15A to 17 is positioned by bringing prism-side contact surfaces 231B of the optical path conversion module 203A into contact with body-side inclination contact surfaces 229B of the body part 202A, and fitting the optical path conversion module 203A to the body part 202A. Further, positioning is also performed by bringing the optical path conversion module 203A into contact with a front endface of the body part 202A.

A body-side positioning part 230 is provided on a front side of the body part 202A. The body-side positioning part 230 includes body-side contact surfaces 229A and the body-side inclination contact surfaces 229B.

The body-side contact surfaces 229A are portions that contact the prism-side contact surfaces 231B of the optical path conversion module 203A described later. The body-side contact surfaces 229A in a pair are each formed on the left and the right of the front endface of the body part 202. A pair of guide pin holes 214 is provided in central parts of respective body-side contact surfaces 229A.

The body-side inclination contact surfaces 229B in a pair are each provided to the top and bottom of the recess 208. The body-side inclination contact surfaces 229B are inclination surfaces that are each parallel to the X-axis and extend toward the center of the up-down direction. An inclination angle of each body-side inclination contact surface 229B may be, for example, 45 degrees. In this way, when prism-side inclination contact surfaces 231C are brought into contact with the body-side inclination contact surfaces 229B for positioning, pressure in the front-rear direction and pressure in the up-down direction are equally distributed, and positioning can be stably performed. Note that the body-side inclination contact surfaces 229B are formed toward the rear with respect to the body-side contact surfaces 229A so as to house the prism-side inclination contact surfaces 231C of the optical path conversion module 203A described later.

The optical path conversion module 203A is attached so as to cover the front endface of the body part 202A including the two guide pin holes 214. Therefore, prism-side guide pin holes 231A described later are provided in the optical path conversion module 203A so as to communicate with the guide pin holes 214. However, similarly to one or more embodiments discussed previously, a housing part that is fitted to and houses the optical path conversion module 203A may be formed, and the optical path conversion module 203A may be fitted so as to be housed between the two guide pin holes 214 of the body part 202A. In this case, the prism-side guide pin holes 231A may not be formed. Note that antireflection coating (AR coating) may be applied to the optical path conversion module 203A.

The optical path conversion module 203A includes a prism-side positioning part 232 for a fit to the body part 202A. The prism-side positioning part 232 includes the prism-side guide pin holes 231A, the prism-side contact surfaces 231B, and the prism-side inclination contact surfaces 231C.

The prism-side guide pin holes 231A in a pair are each provided on the left and the right of the optical path conversion module 203A. The prism-side guide pin holes 231A are provided so as to communicate with the guide pin holes 214 of the body part 202A. Guide pins (not illustrated) are inserted in the prism-side guide pin holes 231A together with the guide pin holes 214, and thus the ferrules 201 (1A and 1B) are aligned with each other. Further, guide pins (not illustrated) are inserted in the prism-side guide pin holes 231A together with the guide pin holes 214, and thus the optical path conversion module 203A is positioned with respect to the body part 202A in the X direction and the RZ direction.

Each of the prism-side contact surfaces 231B is provided on a rear endface of the optical path conversion module 203A. The prism-side contact surfaces 231B contact the body-side contact surfaces 229A of the body part 202A, and thus the optical path conversion module 203A is positioned with respect to the body part 202A in the Z direction.

The prism-side inclination contact surfaces 231C are provided on upper and lower surfaces on sides facing the prism 210A. The prism-side inclination contact surfaces 231C are provided on rib parts formed in a pair on top and bottom of the optical path conversion module 203A. The prism-side inclination contact surfaces 231C are inclination surfaces that are each parallel to the X-axis and extend away from the center of the up-down direction. The prism-side inclination contact surfaces 231C have the same inclination angle as an inclination angle of the body-side inclination contact surfaces 229B, and may have an inclination angle of, for example, 45 degrees. Therefore, the prism-side inclination contact surfaces 231C are fitted to the body-side inclination contact surfaces 229B, and thus the optical path conversion module 203A is positioned with respect to the body part 202A in the Y direction, the RX direction, and the RY direction.

In this way, the body-side positioning part 227 and the prism-side positioning part 228 fix a total of the six axes of the X-axis direction, the Y-axis direction, and the Z-axis direction being movement directions and the RX direction, the RY direction, and the RZ direction being rotation directions, and positioning with a high degree of precision when the optical path conversion module 203 is attached to the body part 202 is performed.

In one or more embodiments, the prism-side inclination contact surfaces 231C are inclination surfaces extending away from the center of the up-down direction of the optical path conversion module 203A, which is an advantageous structure when antireflection coating (AR coating) is performed. In other words, such a structure eliminates a portion being a shadow when antireflection coating (AR coating) is performed by vapor deposition, and, for example, evaporated particles to be obstacles adhering to the prism 210A can be suppressed.

In one or more embodiments, V-shaped grooves 233 are formed between the guide pin holes 214 and the recess 208 of the body part 202A. However, the V-shaped grooves 233 do not contact the prism 210A of the optical path conversion module 203A. In other words, when the optical path conversion module 203A is attached to the body part 202A, the V-shaped grooves 233 and the prism 210A have a small gap therebetween.

Other

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Ferrule;
1A: Flange part;
3: Optical fiber;
3A: Step part;
5: Optical connector;
7: Housing;
10: Ferrule body;
11: Guide hole;
12: Fiber hole;
12A: Tapered part;
12B: Fiber fixing part;
13: Fiber insertion opening;
14: Adhesive filling part;
14A: Upper wall part;
141A: Upper opening;
142A: Upper rib part;
14B: Lower wall part (bottom wall part);
141B: Lower opening;
142B: Lower rib part;
14C: Side wall part;
15: Matching material filling part;
15A: Fiber hole opening surface;
15B: Abutment surface;
151A: Upper opening;
151B: Lower opening;
16: Recessed part;
17: Lens part;
18: Light transmission part;
19: Reflecting surface;
20: Prism plate;
21: Prism part;
22: Flat surface part;
201A and 201B: Ferrule;
202A and 202B: Body part;
203A and 203B: Optical path conversion module;
204: Housing;
205A to 205D: Optical fiber;
206: Light transmission part;
207: Lens part;
208: Recess;
209: Ferrule endface;
210A and 210B: Prism;
211A and 211B: Plate;
212: Plate endface;
213: Flange part;
214: Guide pin hole;
215: Optical fiber hole;
216: Adhesive filling part;
217: Abutment surface;
218A and 218D: Prism surface;
219: Housing part;
220: Body-side positioning part;
221A and 221B: Body-side fitting surface;
221C: V-shaped groove;
222: Prism-side positioning part;
223A and 223B: Prism-side fitting surface;
223C: Prism protrusion;
224A: Body-side contact surface;
224B: Body-side fitting surface;
225A: Prism-side guide pin hole;
225B: Prism-side contact surface;
225C: Rib;
226: Rib fitting surface;
227: Body-side positioning part;
228: Prism-side positioning part;
229A: Body-side contact surface;
229B: Body-side inclination contact surface;
230: Body-side positioning part;
231A: Prism-side guide pin hole;

231B: Prism-side contact surface;
231C: Prism-side inclination contact surface;
232: Prism-side positioning part;
233: V-shaped groove.

The invention claimed is:

1. A ferrule that holds an end part of an optical fiber, the ferrule comprising:
a fiber hole into which the optical fiber is inserted;
an upper wall part and a lower wall part that define a hollow adhesive filling part, wherein
the lower wall part faces the upper wall part, the adhesive filling part is filled with an adhesive applied between the optical fiber inserted in the fiber hole and an inner wall surface of the adhesive filling part,
the upper wall part has an upper opening through which the adhesive passes into the adhesive filling part, and
the lower wall part has a lower opening that ventilates the adhesive filling part to outside of the ferrule.

2. The ferrule according to claim 1, wherein
a plurality of upper openings is provided in the upper wall part, and
a rib part is formed between adjacent upper openings.

3. The ferrule according to claim 1, wherein
the upper opening and the lower opening are arranged to face each other.

4. The ferrule according to claim 1, further comprising:
a recessed part recessed from an endface of the ferrule; and
a lens part formed in the recessed part to correspond to the fiber hole.

5. The ferrule according to claim 4, further comprising a ferrule body and a prism plate, wherein
the ferrule body comprises the fiber hole, the adhesive filling part, the upper opening, and the lower opening, and
the prism plate comprises a prism part that faces the lens part and refracts an optical signal.

6. The ferrule according to claim 1, further comprising a matching material filling part that is filled with a refractive index matching material, wherein
the matching material filling part comprises an opening surface of the fiber hole inside and an abutment surface that faces the opening surface and allows abutment of an endface of the optical fiber.

7. The ferrule according to claim 6, wherein
a direction of the fiber hole is a front-rear direction,
when the endface of the optical fiber abuts the abutment surface, a step part, defined by a sheath of the optical fiber and a bare optical fiber part from which the sheath is removed, is located between both edges in the front-rear direction of the upper opening.

8. The ferrule according to claim 6, wherein
the matching material filling part comprises:
another upper opening through which the refractive index matching material passes into the matching material filling part; and
another lower opening that ventilates the matching material filling part to the outside of the ferrule.

9. A ferrule that holds an end part of an optical fiber, the ferrule comprising:
the optical fiber; and
a fiber hole into which the optical fiber is inserted;
an upper wall part and a lower wall part that define a hollow adhesive filling part, wherein
the lower wall part faces the upper wall part;
the upper wall part has an upper opening through which an adhesive passes into the adhesive filling part; and
the lower wall part has a lower opening that ventilates the adhesive filling part to the outside of the ferrule, and
wherein the optical fiber is inserted in the fiber hole and fixed to the ferrule with the adhesive applied between the upper wall part and the lower wall part from the upper opening.

10. A method of manufacturing a ferrule with an optical fiber comprising:
preparing the ferrule that comprises:
a fiber hole into which the optical fiber is inserted;
an upper wall part and a lower wall part that define a hollow adhesive filling part, wherein
the lower wall part faces the upper wall part;
the upper wall part has an upper opening through which an adhesive passes into the adhesive filling part; and
the lower wall part has a lower opening that ventilates the adhesive filling part to outside of the ferrule;
inserting the optical fiber into the fiber hole;
filling the adhesive in the adhesive filling part from the upper opening;
applying the adhesive between the optical fiber and an inner wall surface of the adhesive filling part; and
fixing the optical fiber to the ferrule with the adhesive.

* * * * *